(12) United States Patent
Lee et al.

(10) Patent No.: US 12,401,419 B2
(45) Date of Patent: Aug. 26, 2025

(54) METHOD AND RECEIVER FOR RECEIVING OPTICAL SIGNAL IN OPTICAL WIRELESS COMMUNICATION SYSTEM

(71) Applicant: LG ELECTRONICS INC., Seoul (KR)

(72) Inventors: Hojae Lee, Seoul (KR); Byounghoon Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 258 days.

(21) Appl. No.: 18/026,414

(22) PCT Filed: Sep. 24, 2021

(86) PCT No.: PCT/KR2021/013019
§ 371 (c)(1),
(2) Date: Mar. 15, 2023

(87) PCT Pub. No.: WO2022/065905
PCT Pub. Date: Mar. 31, 2022

(65) Prior Publication Data
US 2023/0361873 A1 Nov. 9, 2023

(30) Foreign Application Priority Data
Sep. 24, 2020 (KR) .................. 10-2020-0124168

(51) Int. Cl.
*H04B 10/079* (2013.01)
*H04B 10/60* (2013.01)
(52) U.S. Cl.
CPC ....... *H04B 10/07955* (2013.01); *H04B 10/60* (2013.01)

(58) Field of Classification Search
CPC .................. H04B 10/60; H04B 10/07955
(Continued)

(56) References Cited

U.S. PATENT DOCUMENTS 6,333,941 B1 * 12/2001 Hung ................. H01S 3/005
372/6
7,024,059 B2 * 4/2006 Kurchuk ............ H04B 10/6972
398/160
(Continued)

FOREIGN PATENT DOCUMENTS

KR 10-2010-0137699 A 12/2010
KR 10-2011-0018786 A 2/2011
WO WO-2019171053 A1 * 9/2019 ............. H04B 10/29

OTHER PUBLICATIONS

Thorlabs, photodetector lab; 2015; pp. 1-12. (Year: 2015).*

*Primary Examiner* — Amritbir K Sandhu
(74) *Attorney, Agent, or Firm* — BRYAN CAVE LEIGHTON PAISNER LLP

(57) ABSTRACT

A receiver used in an optical wireless communication system is provided. The receiver comprises: a receiving aperture for receiving an optical signal; a coupler for separating the optical signal received by means of the receiving aperture into a main signal and a sensing signal; a sensor for determining a control voltage $V_o$ on the basis of the sensing signal; and a detector for outputting an electric signal which is an output voltage V on the basis of the main signal and control voltage $V_o$. The detector is formed such that the transfer function of the detector changes on the basis of the control voltage $V_o$.

6 Claims, 23 Drawing Sheets

(58) Field of Classification Search
USPC .......................................................... 398/38
See application file for complete search history.

(56) References Cited

U.S. PATENT DOCUMENTS

| | | | | |
|---|---|---|---|---|
| 2002/0101641 | A1* | 8/2002 | Kurchuk | H04B 10/6972 |
| | | | | 330/308 |
| 2010/0067924 | A1* | 3/2010 | Noda | H04B 10/695 |
| | | | | 398/202 |
| 2012/0251102 | A1* | 10/2012 | Terayama | H04B 10/6932 |
| | | | | 398/25 |
| 2014/0270777 | A1* | 9/2014 | Sampayan | H03F 3/08 |
| | | | | 398/187 |
| 2018/0302159 | A1* | 10/2018 | Ritchie | H04B 10/40 |
| 2021/0152022 | A1* | 5/2021 | Kim | H01Q 1/525 |
| 2023/0361873 | A1* | 11/2023 | Lee | H04B 10/60 |

\* cited by examiner (a)

(b)

(a)

(b)

(a)

(b)

METHOD AND RECEIVER FOR RECEIVING OPTICAL SIGNAL IN OPTICAL WIRELESS COMMUNICATION SYSTEM

CROSS-REFERENCE TO RELATED APPLICATIONS

This application is a National Stage filing under 35 U.S.C. 371 of International Application No. PCT/KR2021/013019, filed on Sep. 24, 2021, which claims the benefit of earlier filing date and right of priority to Korean Patent Application No. 10-2020-0124168, filed on Sep. 24, 2020, the contents of which are all incorporated by reference herein in their entirety.

TECHNICAL FIELD

The present disclosure relates to an optical wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication (e.g. 5G).

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

Although 5G communication is still under development, demand for higher data rate is increasing in order to accommodate new services such as virtual reality or autonomous driving.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

According to an aspect of the present disclosure, provided herein is a method of receiving an optical signal by a receiver in an optical wireless communication system. The method includes: receiving the optical signal through a reception aperture; splitting the optical signal received through the reception aperture into a desired signal and a sensing signal through a coupler; determining a control voltage $V_o$ through a sensor based on the sensing signal; and outputting an electrical signal having an output voltage V through a detector of the receiver based on the desired signal and the control voltage $V_o$. The detector is configured to change a transition function of the detector based on the control voltage $V_o$.

In another aspect of the present disclosure, provided herein is a receiver for receiving an optical signal in an optical wireless communication system. The receiver includes a reception aperture configured to receive the optical signal; a coupler configured to split the optical signal received through the reception aperture into a desired signal and a sensing signal; a sensor configured to determine a control voltage $V_o$ based on the sensing signal; and a detector configured to output an electrical signal having an output voltage V based on the desired signal and the control voltage $V_{o,T}$. The detector is configured to change a transition function of the detector based on the control voltage $V_o$.

In each aspect of the present disclosure, the detector may include a photodiode to which the desired signal is input, a noise filter connected to the photodiode, and a load resistor connected to the noise filter and the photodiode and configured to output the electrical signal having the output voltage V.

In each aspect of the present disclosure, the control voltage $V_o$ may be input to the noise filter, and the transition function may have a saturation point $P_{sat}=V_o/\{(R_s+R_L)*R\}$, where $R_s$ denotes a resistance of the photodiode, $R_L$ denotes a resistance of the load resistor, and R denotes a responsivity of the photodiode.

In each aspect of the present disclosure, the control voltage $V_o$ may be input to the load resistor, and the output voltage, related to output of the transition function, may be $V=(I_o0 + R*P)*R_L$, where $I_o$ denotes a dark current, R denotes a responsivity of the photodiode, P denotes a power of the desired signal input to the photodiode, and $R_L$ denotes a resistance of the load resistor.

In each aspect of the present disclosure, the receiver may include a plurality of couplers, a plurality of sensors connected respectively to the plurality of couplers, and a plurality of detectors connected respectively to the plurality of couplers and connected respectively to the plurality of sensors. Each of the plurality of detectors may be configured to change a related transition function based on a control voltage input to a related detector.

In each aspect of the present disclosure, the receiver may further include an interference cancellation and analog-to-digital conversion unit configured to cancel interference from the electrical signal and convert the electrical signal into a digital signal.

In another aspect of the present disclosure, provided herein is a receiver for receiving an optical signal in an optical wireless communication system. The receiver may include: a reception aperture configured to receive the optical signal; a coupler configured to split the optical signal received through the reception aperture into a desired signal and a sensing signal; a sensor configured to determine a control voltage $V_o$ based on the sensing signal; an optical filter configured to attenuate an optical power of the desired signal based on the control voltage $V_o$ and output a desired signal having the attenuated optical power; and a detector configured to output an electrical signal based on the desired signal having the attenuated optical power.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
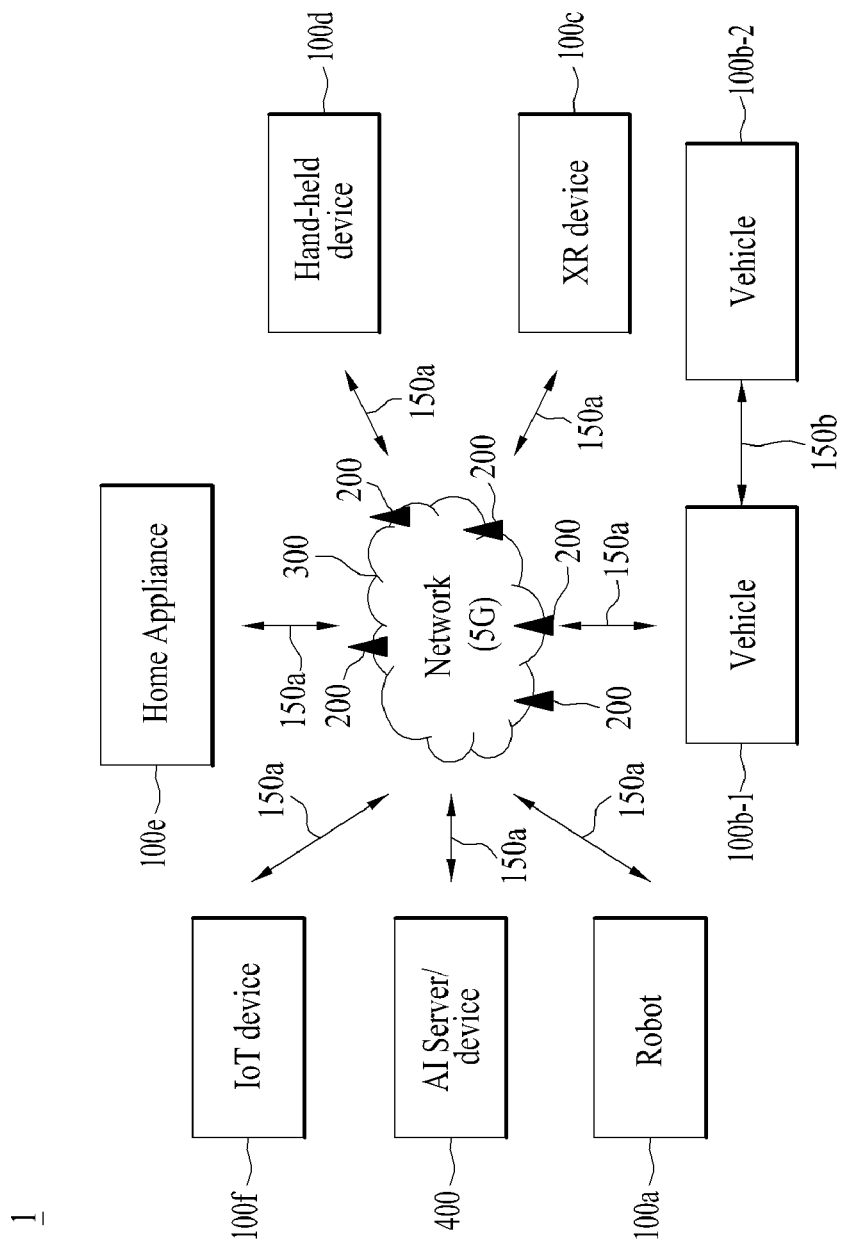
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation (CA) is supported, linkage between a carrier frequency of the DL resources (or DL CC) and a carrier frequency of the UL resources (or UL CC) may be indicated by system information. In this case, the carrier frequency may be equal to or different from a center frequency of each cell or CC.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR, LTE (e.g., E-UTRA), and 6G and so on) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network, or a 6G network to be introduced in the future. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100*f*). Here, the wireless communication/connections such as UL/DL communication 150*a* and sidelink communication 150*b* (or, device-to-device (D2D) communication) may be established by various RATs. The wireless devices and the BSs/wireless devices may transmit/receive radio signals to/from each other through the wireless communication/connections 150*a* and 150*b*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
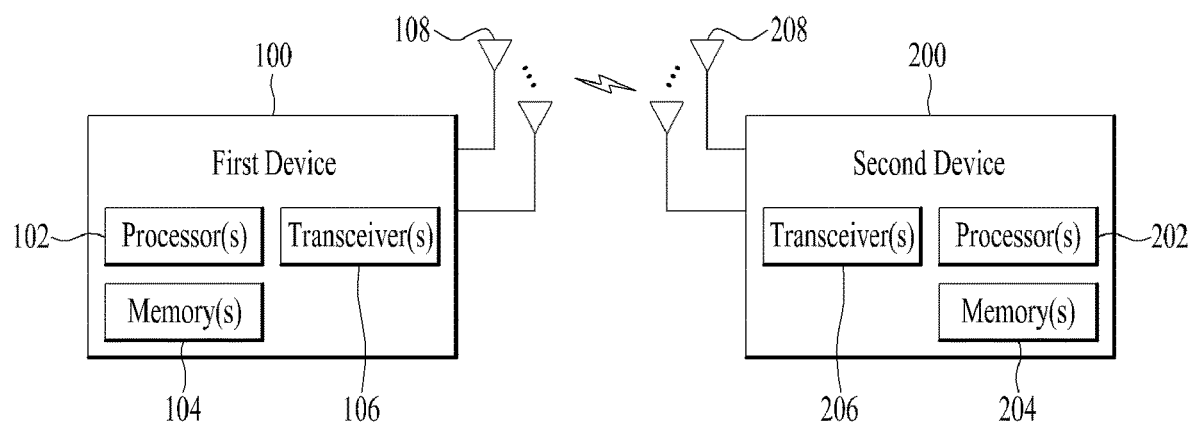
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs. Here, {the first wireless device 100 and the second wireless device 200} may correspond to {the wireless device 100*x* and the BS 200} and/or {the wireless device 100*x* and the wireless device 100*x*} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described /proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT. The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT. The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
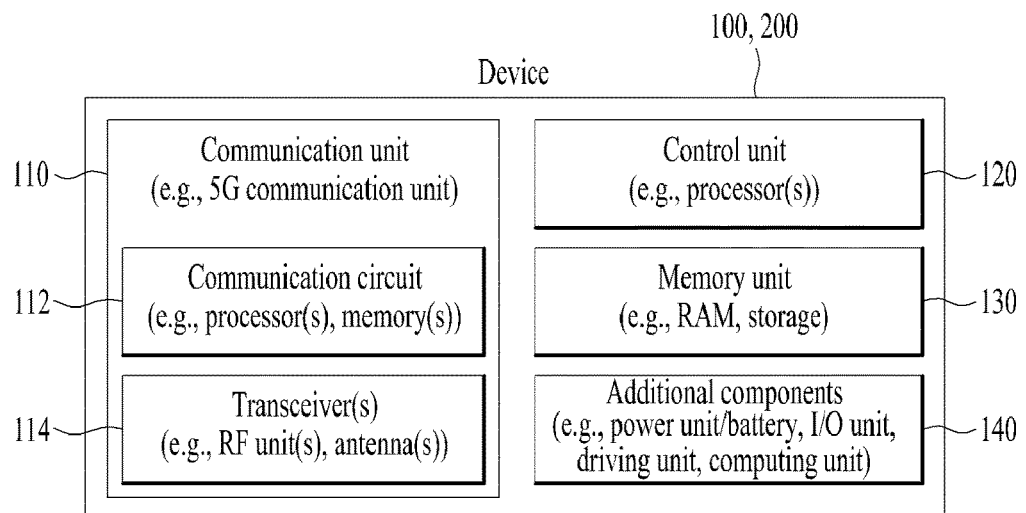
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium A communication device of the present disclosure includes at least one processor; and at least one computer memory operably connected to the at least one processor and configured to store instructions for causing, when executed, the at least one processor to perform operations according to example(s) of the present disclosure described later.

Figure 4:
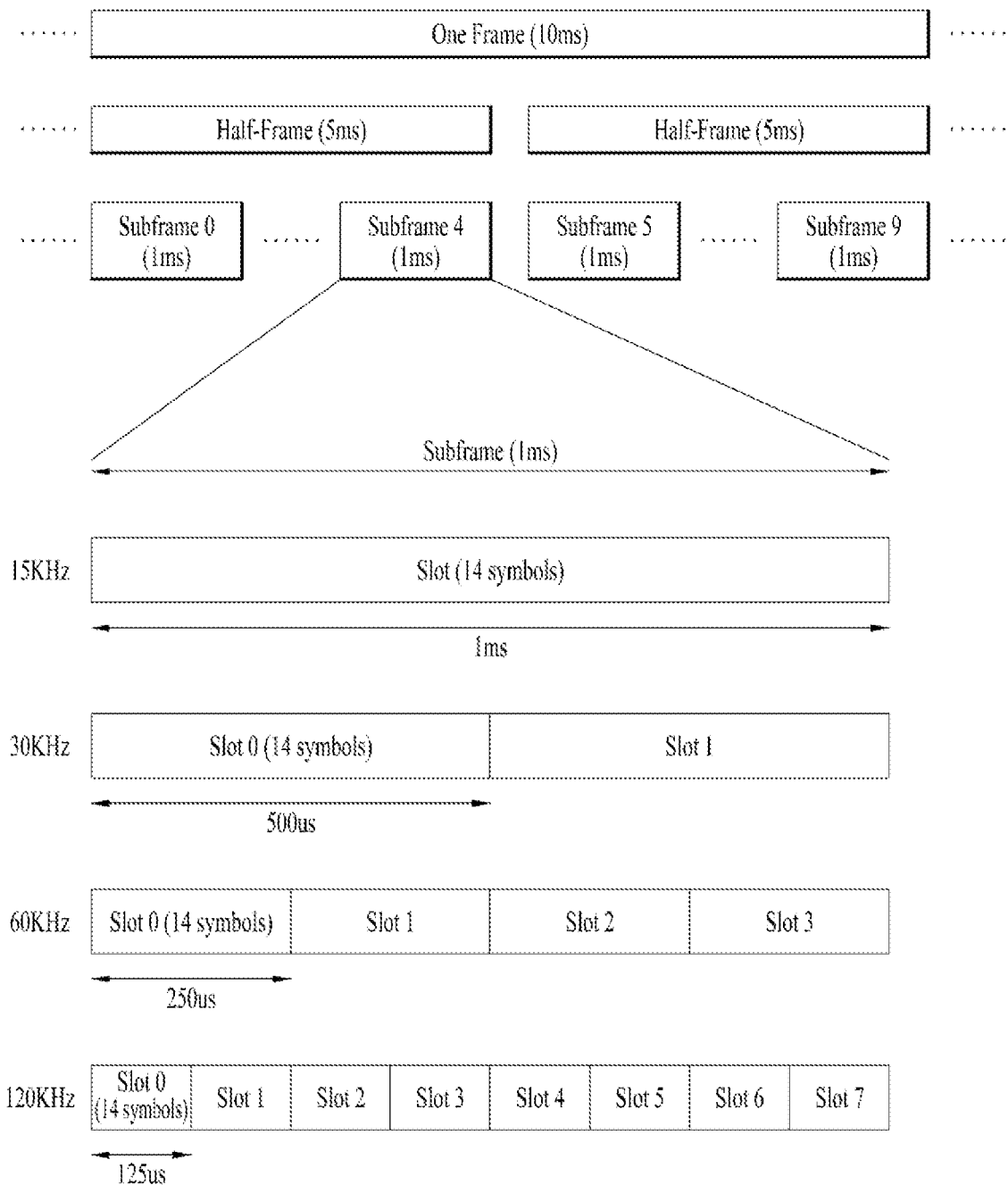
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa T_s/T_f=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
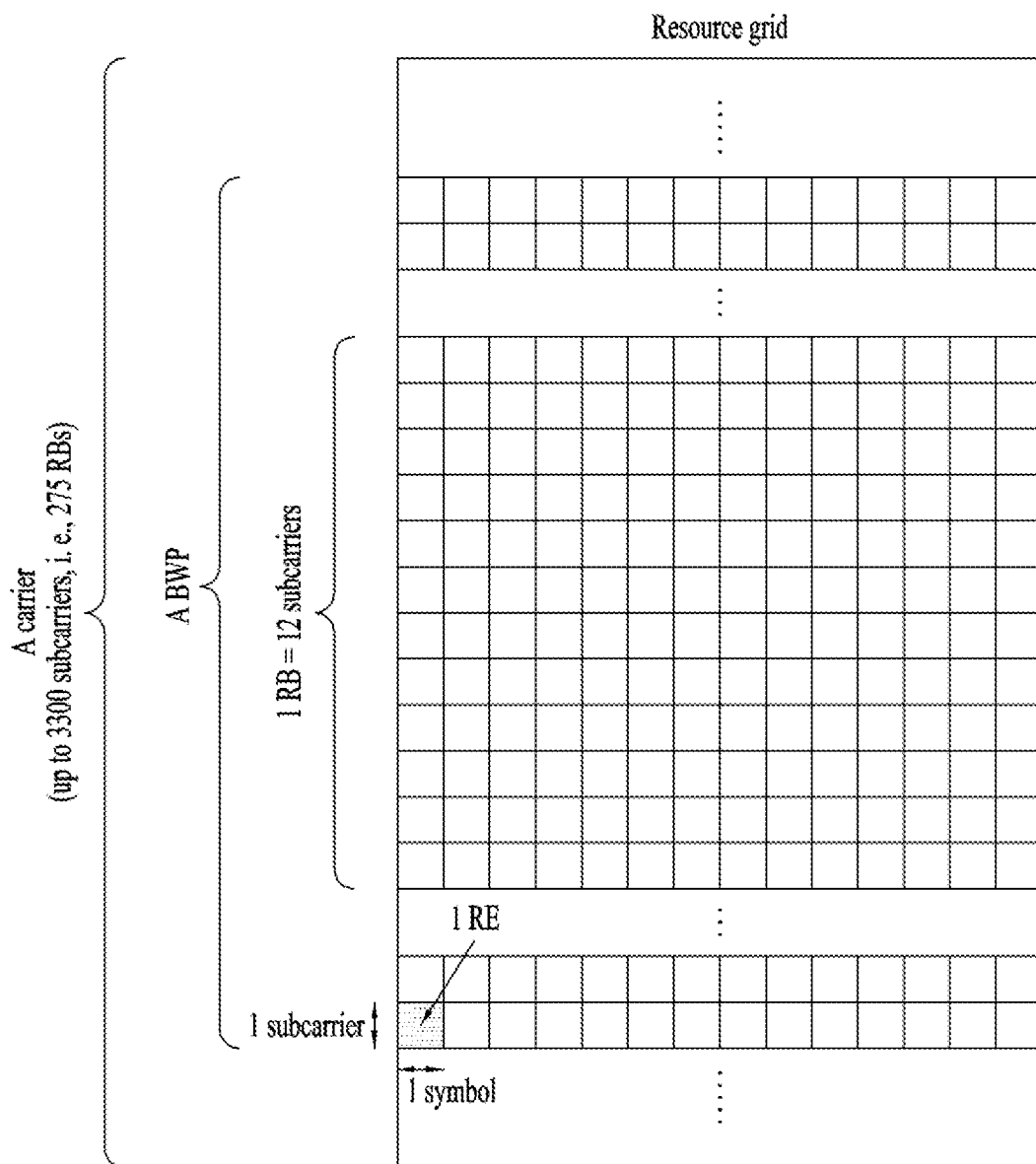
FIG. 5 illustrates a resource grid of a slot.

FIG. 5 illustrates a resource grid of a slot. In the example of FIG. 5, The slot includes multiple (e.g., 14 or 12) symbols in the time domain For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain.

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information. UCI types transmitted on the PUCCH include hybrid automatic repeat request (HARQ)-acknowledgment (ACK) information, a scheduling request (SR), and channel state information (CSI). UCI bits may include HARQ-ACK information bits, if any, SR information bits, if any, link recovery request (LRR) information bits, if any, and CSI bits, if any.

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

Demand for higher data rate is increasing to accommodate incoming new services and/or scenarios in which a virtual world and a real world are mixed. To handle such never-ending requests, beyond-5G new communication technologies are required. A beyond-6G new communication technology (hereafter, referred to as 6G) system has a purpose of (i) very high data rate per device, (ii) very large numbers of connected devices, (iii) global connectivity, (iv) very low latency, (v) reduction of energy consumption of battery-free IoT devices, (vi) ultra-reliable connection, and (vii) connected intelligence with machine learning capabilities. The following technologies are being considered in the 6G system: artificial intelligence (AI), terahertz (THz) communication, optical wireless communication (OWC), free-space optical (FSO) backhaul networks, massive MIMO technologies, blockchain, three-dimensional (3D) networking, quantum communication, unmanned aerial vehicles (UAVs), cell-free communication, integration of wireless information and energy transmission, integration of sensing and communication, integration of access-backhaul networks, holographic beamforming, big data analysis, and large intelligent surfaces (LIS).

OWC technologies are one of promising solutions to a bandwidth limitation problem faced by wireless systems. The OWC technologies have been planned for 6G communication in addition to RF-based communication for all possible device-to-access networks. The OWC technologies have already been used since a 4G communication system but are expected to be used more widely to meet the demands of the 6G communication system. The OWC technologies, such as light fidelity, visible light communication, optical camera communication, and optical band-based FSO communication, are already well-known technologies. The OWC technologies may provide very high data rate, low latency, and secure communication. LiDAR, which is also based on the optical band, may be used for ultra-high-resolution 3D mapping in 6G communication.

Figure 6:
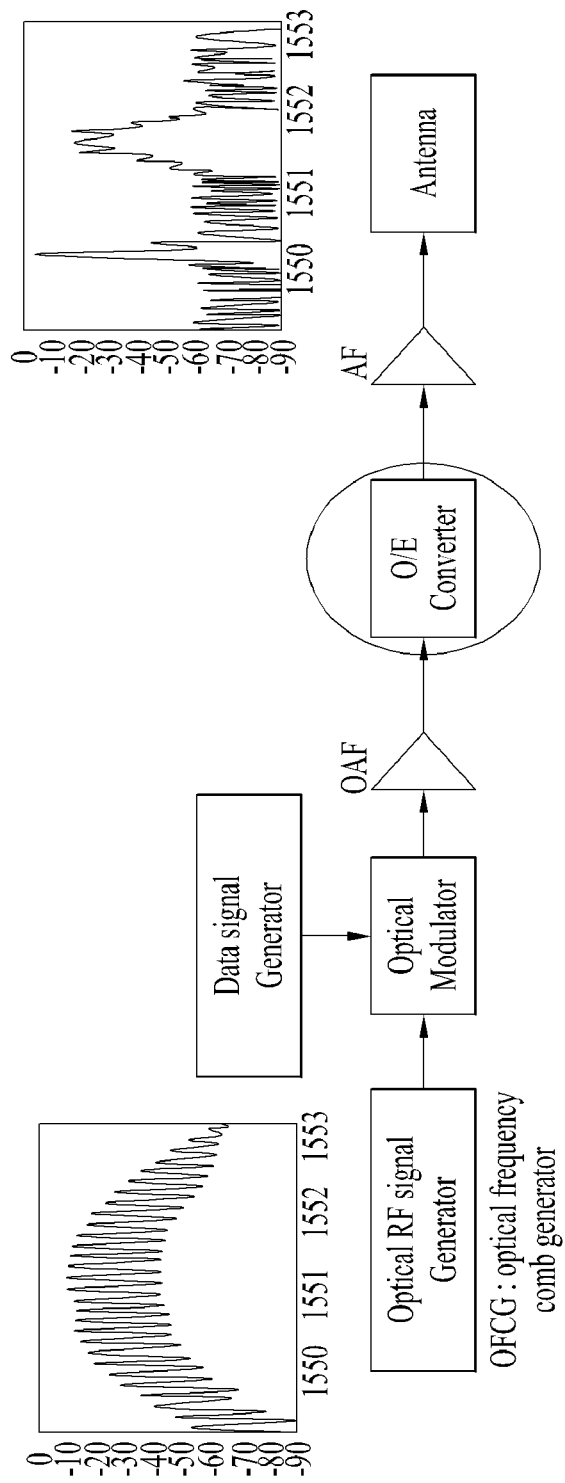
FIG. 6 illustrates the structure of an optical-to-electrical converter usable for optical wireless communication.

FIG. 6 illustrates the structure of an optical-to-electrical (O/E) converter usable for OWC. In particular, FIG. 6 illustrates the structure of a photon source-based transmitter.

Referring to FIG. 6, in general, a phase of a signal may be changed by passing an optical source of a laser through an optical wave guide. In this case, data is carried on a transmission signal by changing electrical characteristics through microwave contact or the like. Thus, output of an optical modulator is formed in a modulated waveform. The O/E converter may generate terahertz (THz) pulses according to an optical rectification operation by nonlinear crystal, O/E conversion by a photoconductive antenna, and/or emission from a bunch of relativistic electrons. The THz pulses generated in the above manner may have a length in femtoseconds to picoseconds. The O/E converter may perform down-conversion using the nonlinearity of an element.

Figure 7:
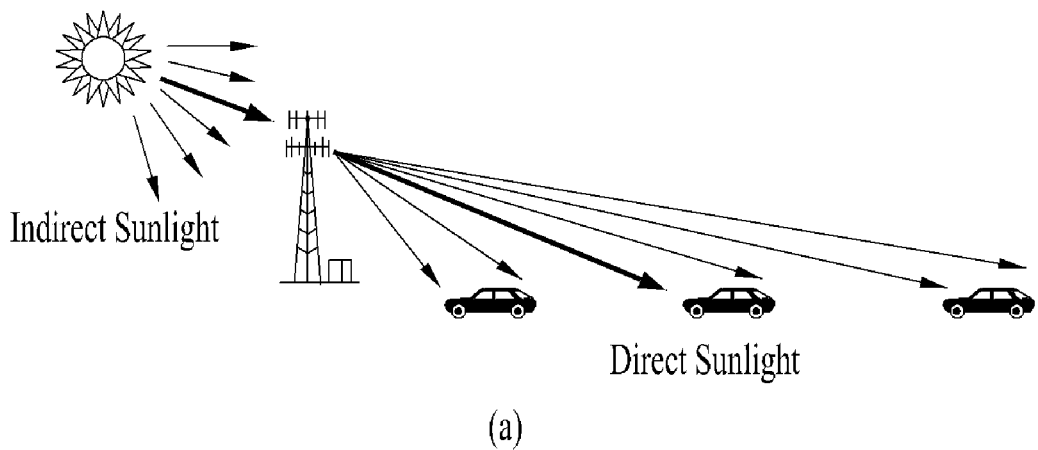
FIG. 7 illustrates ambient light in an optical wireless communication system.
Figure 7:
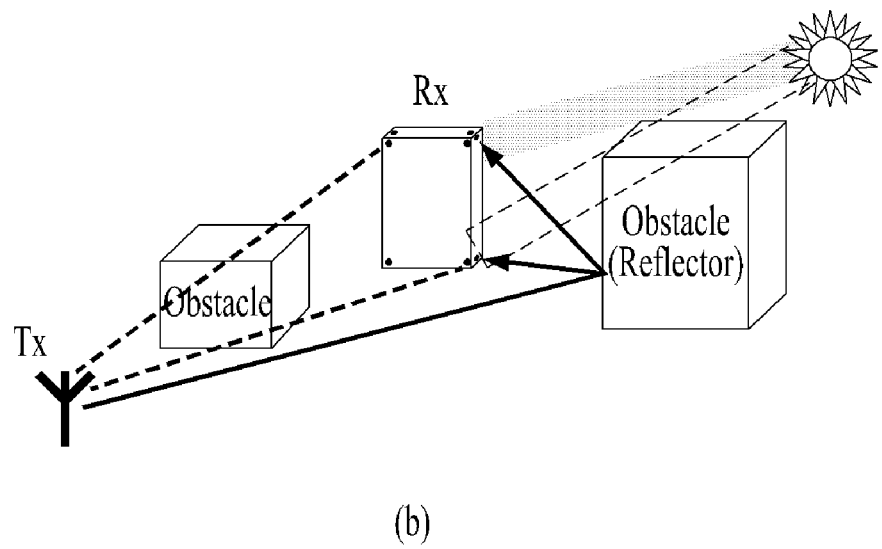

FIG. 7 illustrates ambient light in an OWC system.

OWC receivers receive background noise caused by ambient light, as well as desired signals. Main sources of ambient light in OWC systems include sunlight, and fluorescent and incandescent bulbs. A significant amount of power emitted by these sources may be detected in the OWC system. In the OWC system, when a receiver is irradiated with strong interference from ambient light, there is a problem in that interference from ambient light is relatively large compared to a target signal. Theoretically, the magnitude of ambient light may be about 0.26 $W/m^2/nm$ at maximum with respect to a wavelength of 1550 nm. That is, theoretically, the magnitude of ambient light is about 0.26 W at the maximum in an area of 1 $m^2$ per wavelength of 1 nm.

In the OWC system, a very small beam width may be expected, unlike RF communication of LTE or NR. In a mobile OWC system environment considering mobility, unlike OWC in a fixed point environment, a line-of-sight (LOS) may not always be guaranteed due to the mobility and rotatability of a mobile device, reception for a non-line-of-sight (NLOS) path through a reflector is required in order to prevent link failure caused by an obstacle. Accordingly, a receiver capable of configuring a plurality of reception links is needed to receive the NLOS path of the mobile device or acquire reception diversity. However, for reception on the NLOS path, when diversity for the reception path is obtained by forming a plurality of reception links in the receiver, the probability of ambient light interference increases.

If the intensity of ambient light received by the receiver is high, the ambient light may saturate a photodetector of the receiver. Once the photodetector reaches a saturation point, a photodiode of the photodetector gradually operates non-linearly, so that the photodiode reaches a damage threshold point. The photodiode that has reached the damage threshold point may no longer convert an excess in incident optical power into photocurrent and all extra energy received by the photodetector will typically be absorbed as heat. This heat inside the photodetector may irreversibly damage the photodiode because the heat makes wiring bonds on the surface of the photodiode, which are fragile, dangerous. Accordingly, a receiver supporting an adaptive operation for preventing damage to the photodiode caused by ambient light is required.

Hereinafter, a reception method and apparatus capable of preventing damage to a photodiode of a receiver will be described. The structure of a receiver capable of forming a plurality of reception links to obtain reception diversity will also be described.

In some implementations of the present disclosure, the receiver may form a plurality of reception links to obtain reception diversity.

Figure 8:
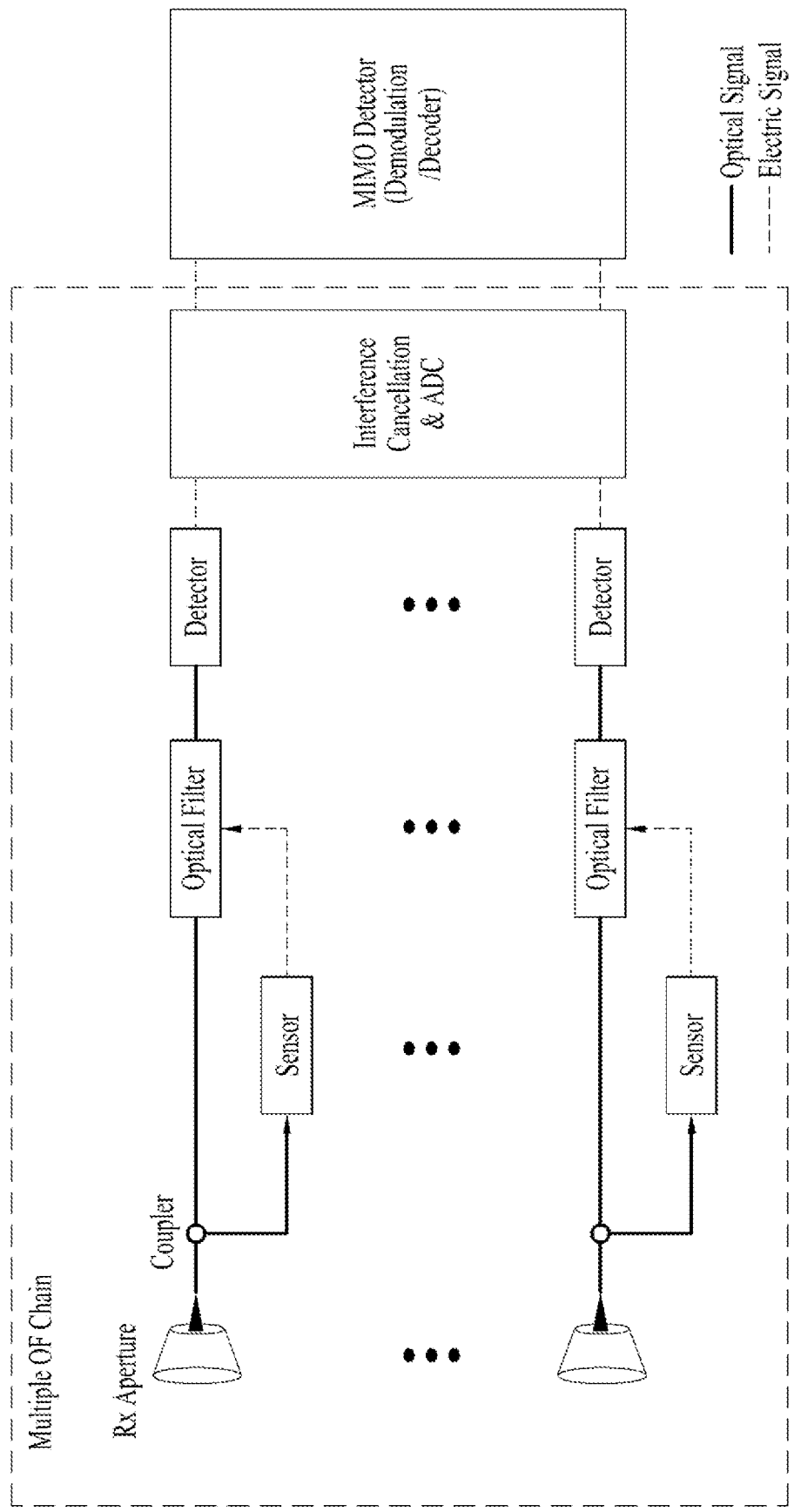
FIGS. 8 and 9 illustrate examples of receivers according to some implementations of the present disclosure.
Figure 9:
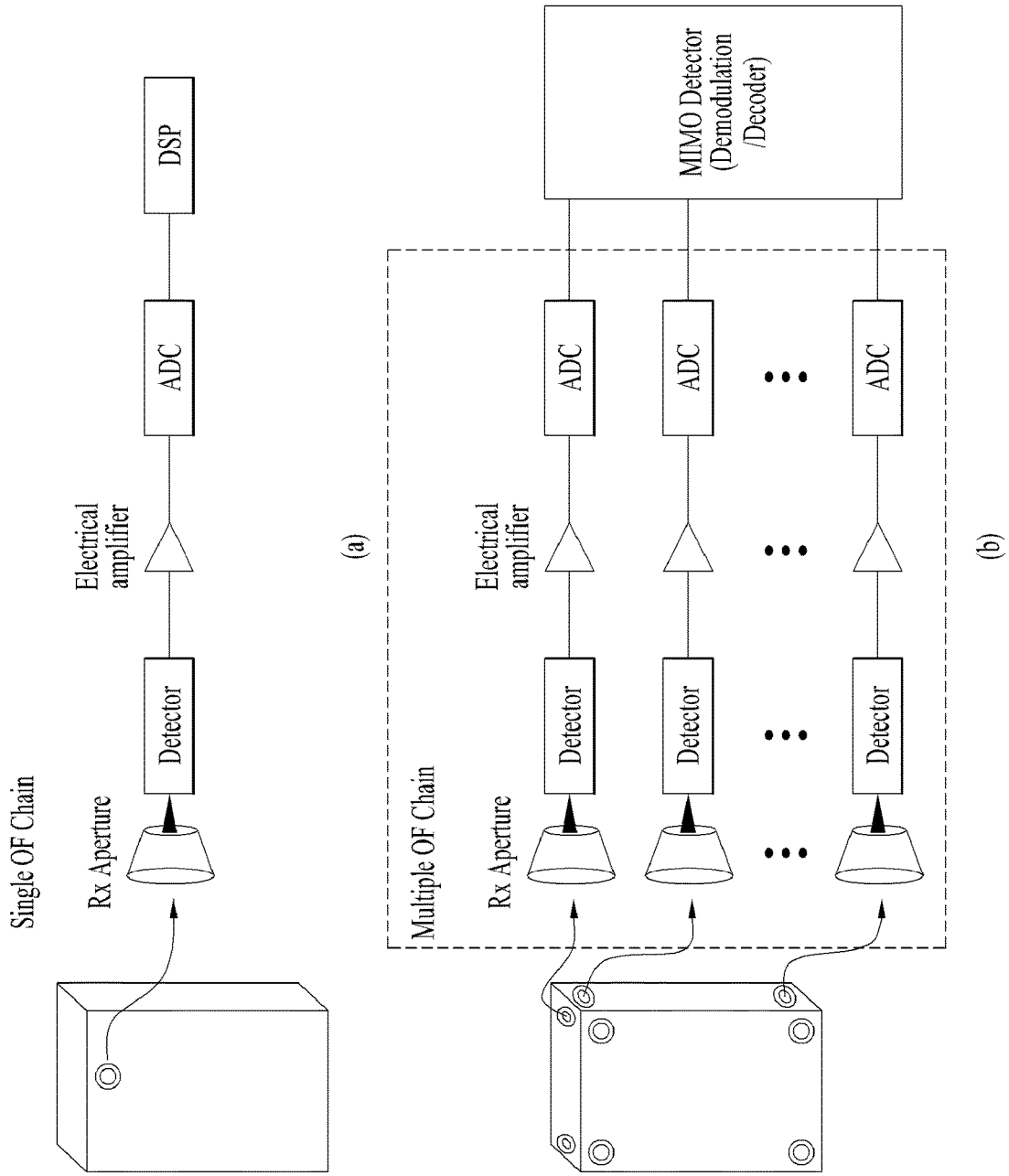

FIGS. 8 and 9 illustrate examples of receivers according to some implementations of the present disclosure. In particular, FIG. 8 illustrates a receiver forming a single chain based on a single reception (Rx) aperture, and FIG. 9 illustrates a receiver forming multiple chains based on a plurality of Rx apertures.

Referring to FIG. 8, a receiver generally includes an Rx aperture through which an optical signal is incident, a detector (including an O/E converter (e.g., a photodiode) that converts an optical signal into an electrical signal), an electrical amplifier that amplifies the converted electrical signal, and an analog-to-digital converter (ADC).

Since the Rx aperture has a limited Rx field-of-view (FoV), omnidirectional reception by the receiver using a single Rx aperture is impossible, and an LOS link with a transmitter is not always guaranteed due to the direction of a UE. In view of this point, in some implementations of the present disclosure, the receiver forming multiple chains based on multiple RX apertures, as illustrated in FIG. 9, may be used.

According to the receiver as illustrated in FIG. 9, omnidirectional reception by the receiver may be supported according to configuration of each Rx aperture. The Rx aperture is a part that directly receives a desired optical signal and may be composed of a lens, an optical phased array, liquid crystal, a metasurface, etc.

Figure 10:
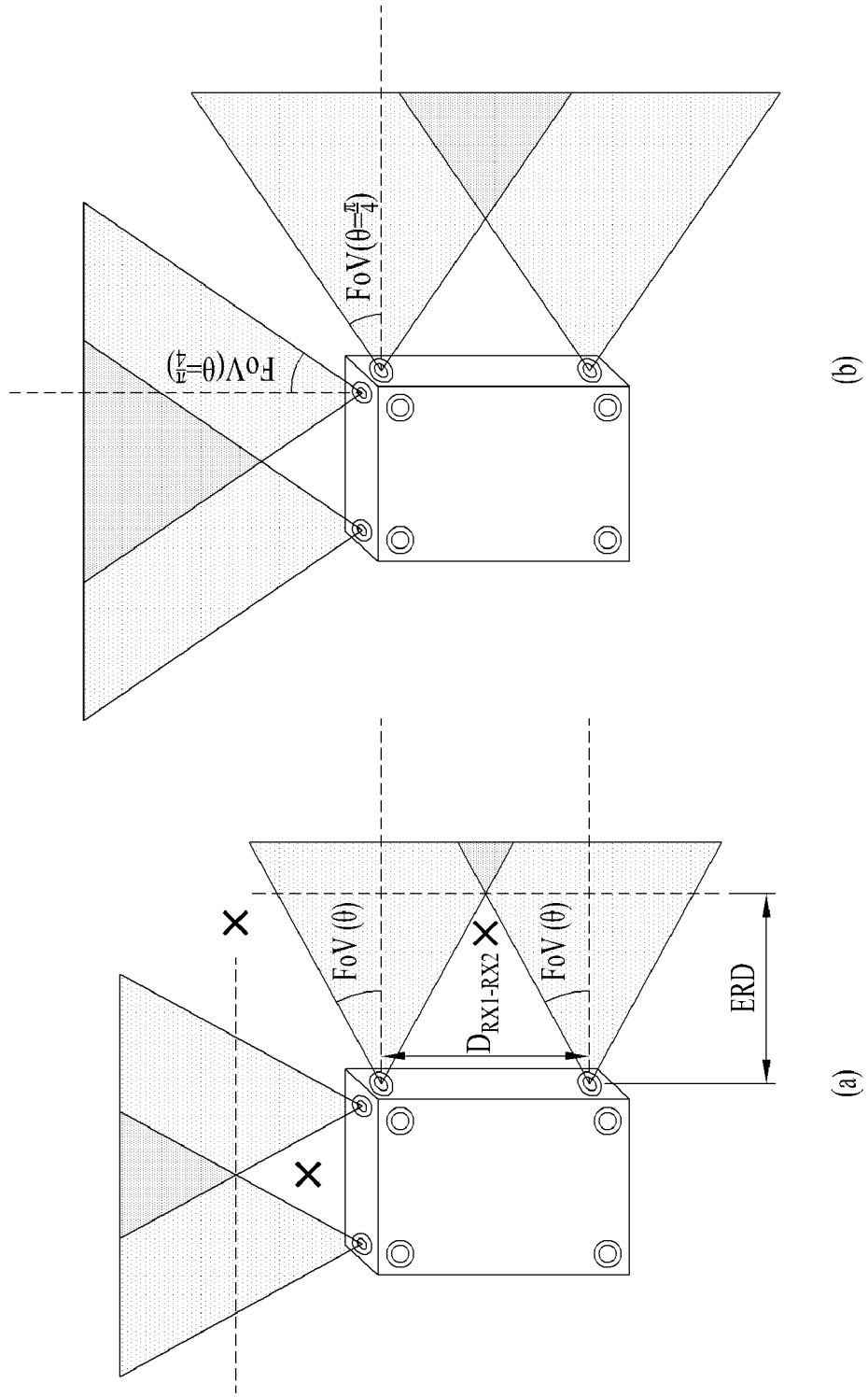
FIG. 10 illustrates a field of view (FoV) of a reception (Rx) aperture.

FIG. 10 illustrates a field of view (FoV) of an Rx aperture.

When the Rx aperture is composed of an FoV controllable lens, a distance forming an effective NLOS path varies according to the FoV. For example, referring to FIG. 10, an effective reflector distance (ERD), which is a distance of a reflector forming the effective NLOS path, by FoV($\theta$) and by a distance, $D_{Rx1-Rx2}$, between Rx apertures of the receiver, may be determined as ERD=$(D_{Rx1-Rx2})/\tan\theta$.

In the structure illustrated in FIG. 10, the NLOS path due to the reflector from within the ERD is incapable of being guaranteed. For example, when ERD=1 m and $D_{Rx1-Rx2}$=0.1 m, then $\theta$=5.7°. In the structure illustrated in FIG. 10, reception for the NLOS path for a corner angle of the receiver may not be guaranteed. Therefore, in FoV control for omnidirectional reception, FoV ($\theta$=$\pi$/4) should be satisfied to guarantee the NLOS path due to the reflector corresponding to the corner angle of the receiver. An increase in FoV facilitates Rx diversity acquisition by increasing an Rx probability of the LOS/NLOS path, but also increases an interference Rx probability. Therefore, a method capable of performing omnidirectional reception while reducing the interference probability is needed.

When the Rx aperture is configured with a device capable of performing Rx beamforming (e.g., an optical phased array, liquid crystal, a metasurface, etc.), Rx diversity may be obtained by performing Rx beam steering through a beam search procedure. That is, one Rx aperture may be composed of a plurality of antenna arrays, lens arrays, and/or metasurfaces without being limited to one lens. For example, this may be schematized as follows.

However, even if the receivers or Rx apertures illustrated in FIGS. 8 to 10 are used, the receivers may not recognize whether an incident optical signal is a desired signal or interference at a stage before a detector. Therefore, if very strong interference light (e.g., sunlight) is incident, the detector may be damaged.

Hereinafter, a method and a structure for interference recognition and interference control will be described.

Figure 11:
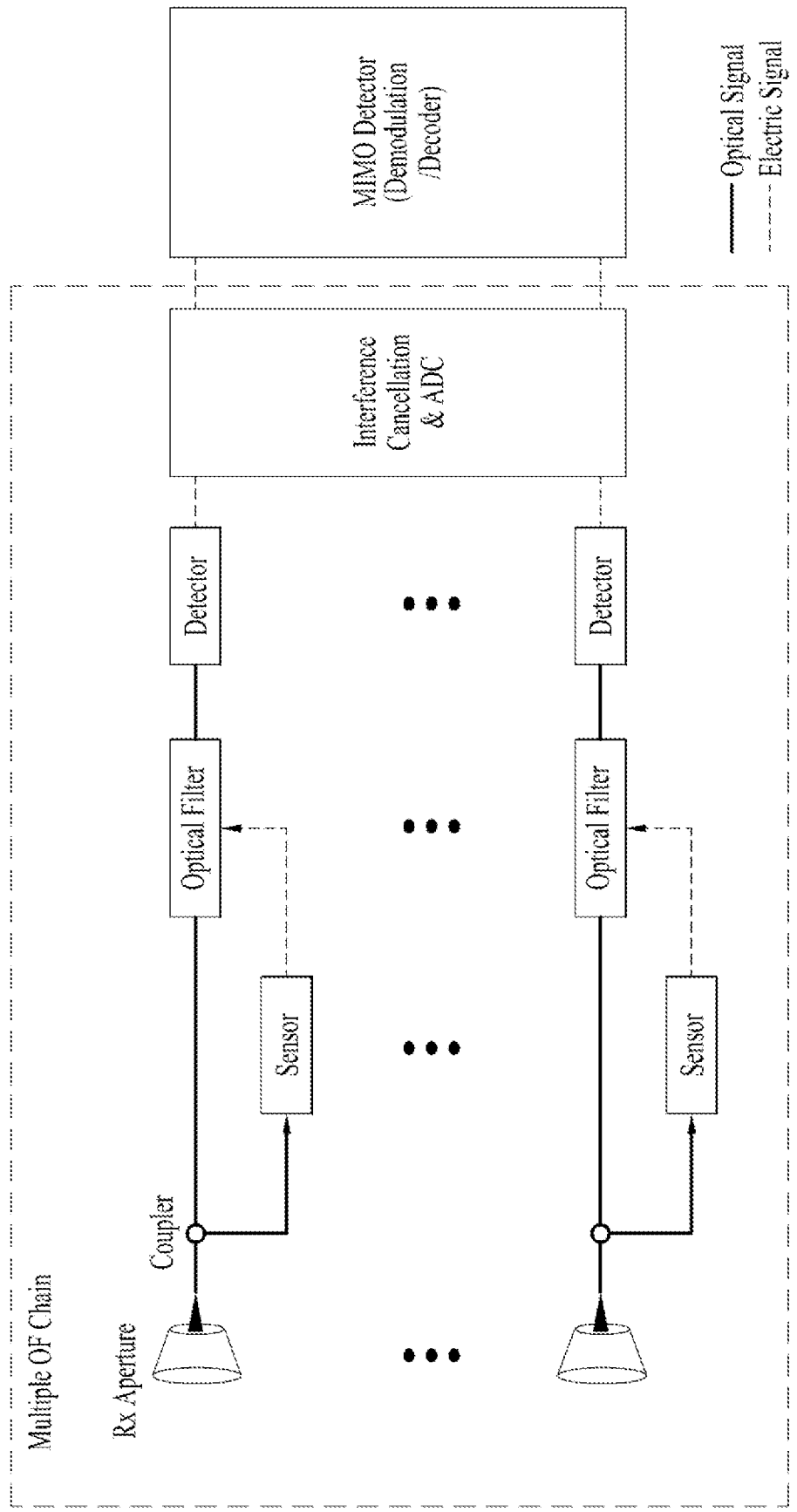
FIG. 11 illustrates an example of the structure of a receiver according to some implementations of the present disclosure.

FIG. 11 illustrates an example of the structure of a receiver according to some implementations of the present disclosure.

Referring to FIG. 11, each optical frequency (OF) chain may include an Rx aperture, a coupler, a sensor, an optical filter, and a detector. The receiver may include an interference cancellation (IC) and ADC unit.

In the receiver, the Rx aperture is configured for omnidirectional reception of an optical signal and may be composed of a lens, an optical phased array, liquid crystal, a metasurface, and the like.

In the receiver, the coupler is configured to split an Rx signal into a desired signal and a sensing signal and may be configured with an optical signal splitter.

In the receiver, the sensor is configured for interference measurement and may be configured with a solar sensor, a photodiode, or the like.

In the receiver, the optical filter is configured for O/E conversion of the desired signal and may be configured using a photodiode.

In the receiver, the IC and ADC unit is a device that cancels an interference element from an electrical signal O/E converted by the detector and converts the electrical signal into a digital signal through an ADC.

In the receiver, a MIMO detector is a device that decodes a target signal based on the digital signal obtained through multiple chains and the IC and ADC unit.

Hereinbelow, the structures of receivers according to some implementations of the present disclosure will be described in more detail.

Structure of Sensor-Based Interference Recognition Receiver

Figure 12:
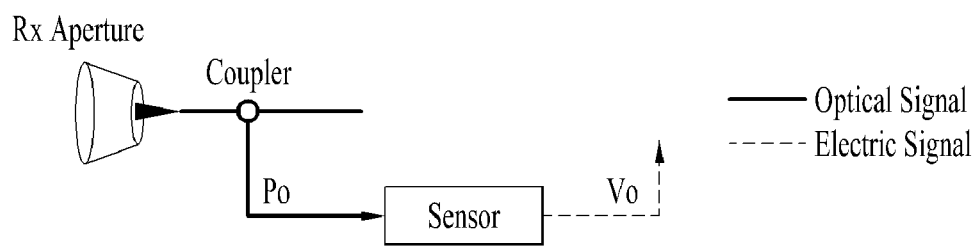
FIGS. 12 and 13 illustrate an example of a portion of an Rx chain of a receiver and an example of a transition function of a sensor according to some implementations of the present disclosure.
Figure 13:
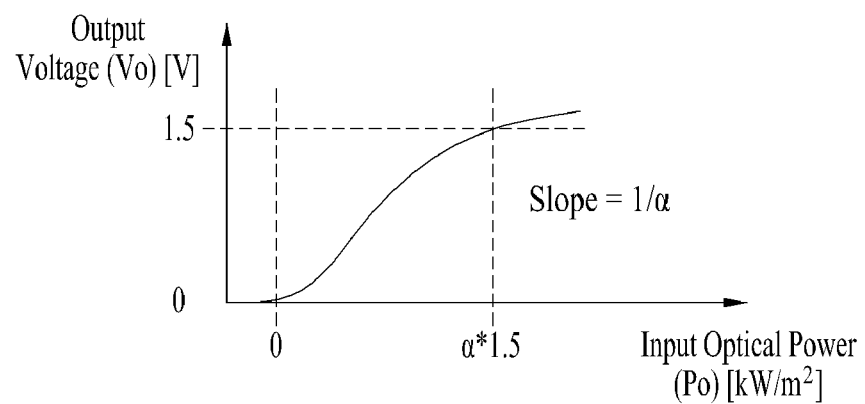

FIGS. 12 and 13 illustrate an example of a portion of an Rx chain of a receiver and an example of a transition function of a sensor according to some implementations of the present disclosure.

Referring to FIG. 12, an optical signal received by an Rx aperture is split into a desired signal $P_i$ and a sensing signal $P_o$ in a ratio of $P_i$:$P_o$=(1−$\alpha$):$\alpha$ by a coupler, and the split sensing signal is input to a sensor. In this case, if an input optical power is $P_o$, the sensor outputs an output voltage $V_o$.

FIG. 13 illustrates a transition function of the sensor used in FIG. 12.

In the example of FIG. 12, when the input optical power $P_o$ is in the range of 0 to $\alpha*1.5$ [kW/m²], the sensor guarantees linear conversion having a transition slope of $1/\alpha$ in the corresponding range, and the output voltage $V_o$ is in the range of 0 to 1.5 V.

In the case of a solar sensor that is expensive but has a wide input range, since a linear interval of voltage transition against the input optical power may accommodate a maximum magnitude of 1.5 kW/m² of ambient light interference, the input optical power may be converted into an output power regardless of the split ratio of the coupler. In contrast, in the case of a general photodiode with a narrow input range, since the linear interval of voltage transition against the input optical power may not accommodate a maximum magnitude of 1.5 kW/m² of ambient light interference, linear transition should be ensured through the split ratio $\alpha$ of the coupler. That is, if a maximum input optical power of a photodiode (PD) used as the sensor is A [kW/m²], the split ratio $\alpha$ of the coupler is A/1.5. For example, if a PD with A=0.15 [kW/m²] is used as the sensor, the split ratio of the coupler is $\alpha$=0.1, and a desired signal and a sensing signal are split in a ratio of 0.9:0.1 by the coupler.

Since the purpose of the sensor is to measure the magnitude of a signal, the optical bandwidth of the sensor that needs to perform only envelop detection may be lower than the bandwidth of the detector.

In the example of FIG. 13, although the maximum accommodation Rx magnitude of the sensor is described as $\alpha*1.5$ kW/m², the maximum accommodation Rx magnitude may be configured based on the maximum magnitude of ambient light for a center frequency band of a communication system used. For example, theoretically, since the magnitude of the ambient light is a maximum of 0.26 W/m²/nm with respect to a wavelength of 1550 nm, if a wavelength corresponding to used bandwidth is 1 nm, the maximum accommodation Rx magnitude of the sensor may be $\alpha*0.26$ W/m². Therefore, $(1-\alpha)*1.5$ kW/m², which is a reference point of the input optical power described later, may all be replaced with $(1-\alpha)*0.26$ W/m² with respect to a wavelength of 1550 nm.

When the maximum magnitude of ambient light according to bandwidth is configured as a reference, the sensor may operate after receiving only a target band through an optical bandpass filter positioned at the rear end of the Rx aperture.

Damage to a PD may be largely prevented by the following two methods based on a portion of the Rx chain illustrated in FIG. 12:

i) adjusting optical power input to the PD; and
ii) changing a transition function of the PD.

Hereinafter, examples of the structures of receivers that prevent damage to the PD according to the above two methods will be described.

Structure of Attenuator-Based Interference Control Receiver

In some implementations of the present disclosure, an attenuator may be used to adjust the optical power input to the PD.

Figure 14:
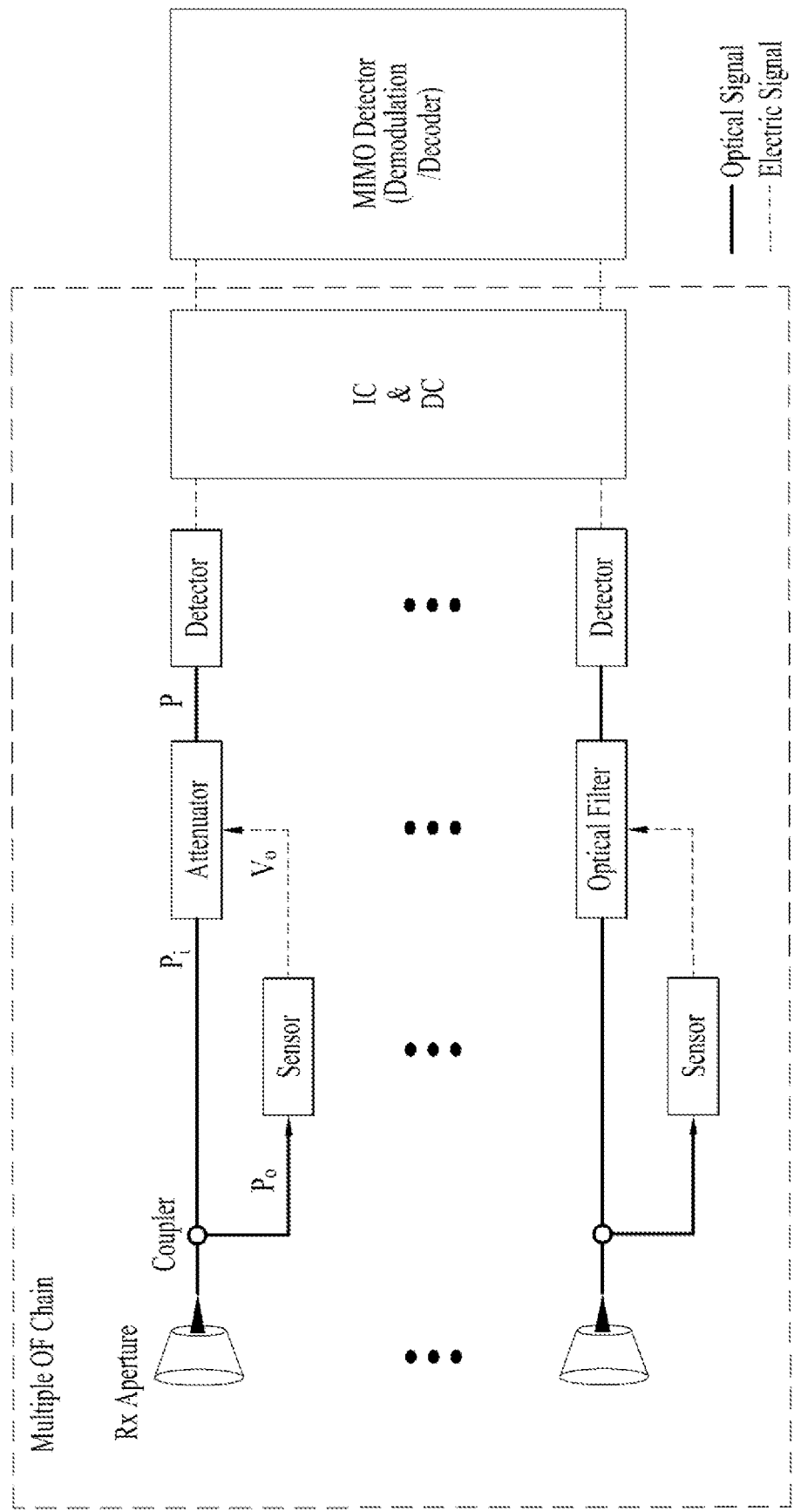
FIG. 14 illustrates an example of the structure of a receiver including a sensor and an attenuator according to some implementations of the present disclosure.

FIG. 14 illustrates an example of the structure of a receiver including a sensor and an attenuator according to some implementations of the present disclosure.

The optical filter for controlling a desired signal based on the magnitude of the sensing signal measured by the sensor described with reference to FIG. 12 may be configured by the attenuator. Referring to FIG. 13, the attenuator may be used for damage protection of the PD by controlling the magnitude of the desired signal incident upon a detector.

Referring to FIG. 14, an optical signal received by an Rx aperture is split into a desired signal $P_i$ and a sensing signal $P_o$ in a ratio of $P_i$:$P_o$ by a coupler, and the split desired signal $P_i$ is input to the attenuator. In this case, an input optical power $P_i$ is converted into an output optical power P.

Figure 15:
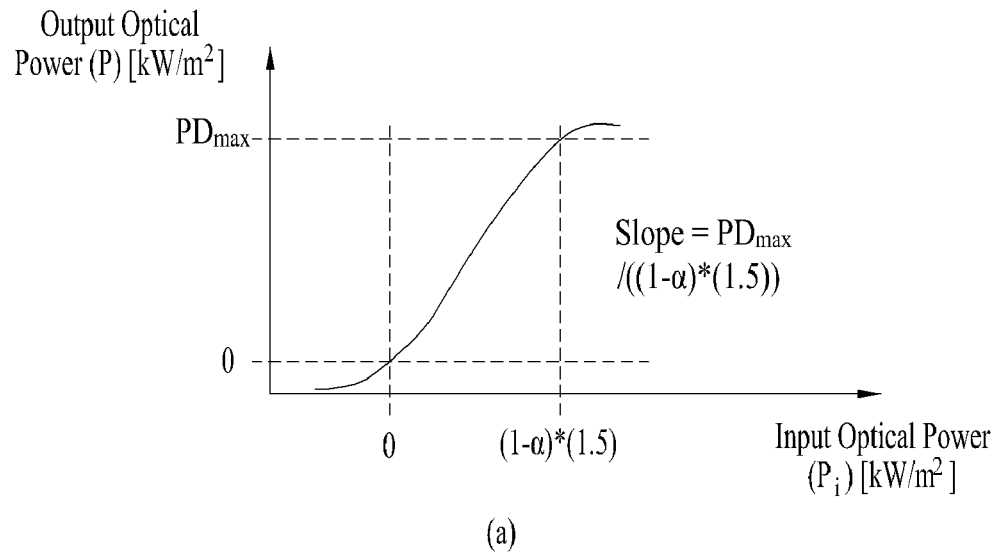
FIG. 15 illustrates transition functions of the attenuator used in FIG. 14.
Figure 15:
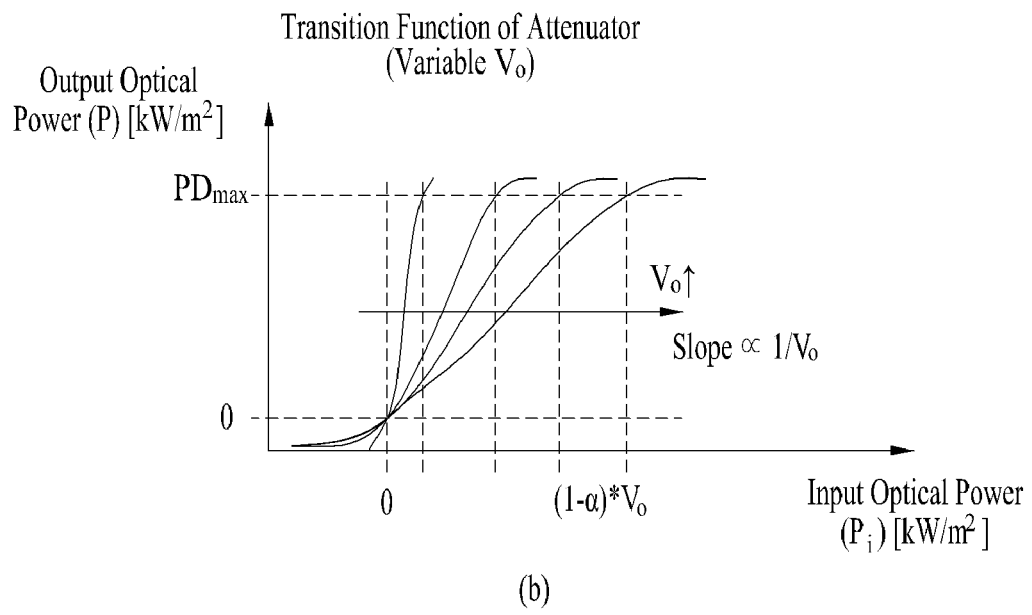

FIG. 15 illustrates transition functions of the attenuator used in FIG. 14.

In FIG. 15(a), when an input optical power $P_i$ is in the range of 0 to $(1-\alpha)*1.5$ [kW/m²], the attenuator guarantees linear conversion, a transition slope of which is $PD_{max}/((1-\alpha)*1.5)$ with respect to the corresponding range, and an output optical power P is in the range of 0 to $PD_{max}$. Here, $PD_{max}$ is maximum input constraints corresponding to a saturation point of the PD, which is the detector.

If the magnitude of the desired signal is attenuated by the attenuator, damage to the PD due to input of interference to the desired signal may be prevented. However, since large attenuation is applied even when the desired signal has no interference, the magnitude of an electric signal converted by the PD becomes small due to attenuation of the desired signal, and when a signal is decoded at a MIMO detector stage, performance is deteriorated due to relative influence of noise.

Accordingly, in some implementations of the present disclosure, interference attenuation based on a variable attenuator that adaptively performs attenuation based on the magnitude of an optical signal measured by the sensor may be performed. The variable attenuator is a device by which a peak slope between an input optical power and an output optical power is changed according to a control voltage. In the example of FIG. 15(b), when an input optical power $P_i$ is in the range of 0 to $(1-\alpha)*V_o$ [kW/m²], the variable attenuator guarantees linear conversion, a transition slope of which is $Slope \propto 1/V_o$, according to a control voltage $V_o$ in the corresponding range, and an output optical power P in the range of 0 to $PD_{max}$ [kW/m²]. Here, $PD_{max}$ is maximum input power constraints corresponding to a saturation point of the PD, which is the detector.

If the magnitude of the desired signal is attenuated by the variable attenuator according to $V_o$ measured by the sensor, linearity of the PD may be ensured and damage to the PD may be prevented, even when interference is input to the desired signal. For example, if the slope of the variable attenuator becomes $PD_{max}/((1-\alpha a)*V_o)$, the slope of the variable attenuator may be controlled by $V_o$ measured by the sensor, and the maximum magnitude of the output optical power may always be maintained at $PD_{max}$. Even when the input optical power is small, the maximum magnitude of the output optical power may always be maintained at $PD_{max}$. In addition, when there is no interference with the designed signal, since the maximum magnitude of the input optical power is attenuated in correspondence to $PD_{max}$, the magnitude of an electrical signal converted by the PD may be maintained, and the relative influence of noise when a signal is decoded at the MIMO detector stage may be reduced, so that the performance of the receiver may be maintained.

Structure of Switch-Based Interference Control Receiver

In some implementations of the present disclosure, a switch may be used to control the optical power input to the PD.

Figure 16:
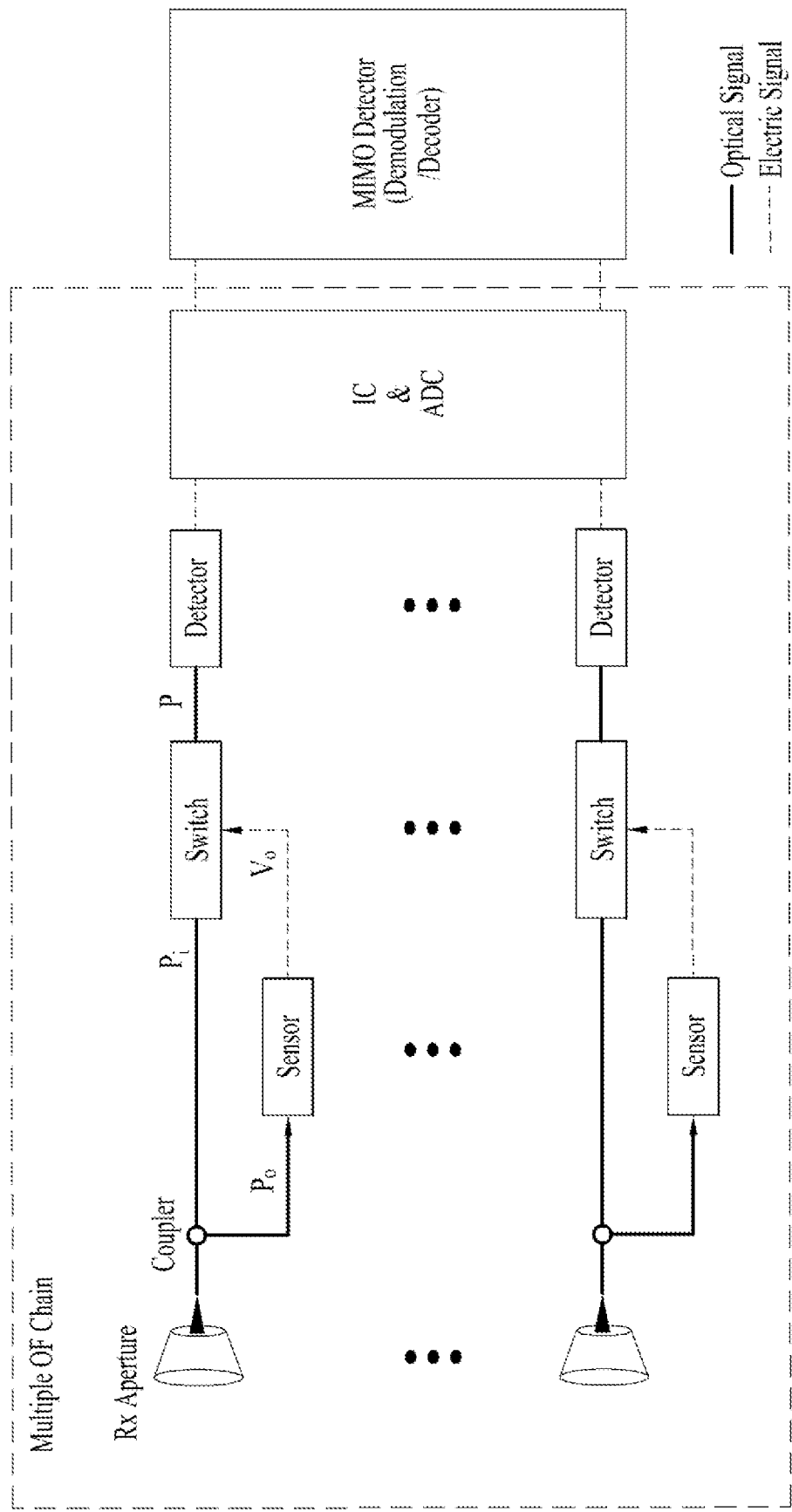
FIG. 16 illustrates an example of the structure of a receiver including a sensor and a switch according to some implementations of the present disclosure.

FIG. 16 illustrates an example of the structure of a receiver including a sensor and a switch according to some implementations of the present disclosure.

Referring to FIG. 16, the optical filter for controlling a desired signal based on the magnitude of a sensing signal measured by the sensor may be configured by a switch. The switch may be used for damage protection of the PD according to whether the desired signal is incident upon a detector.

Referring to FIG. 16, an optical signal received by an Rx aperture is split into a desired signal $P_i$ and a sensing signal $P_o$ in a ratio of $P_i:P_o$ by a coupler, and the split desired signal $P_i$ is input to the switch. In this case, an input optical power $P_i$ is converted into an output optical power P according to the operation of the switch. For example, if the switch is ON, $P=P_i$, and if the switch is OFF, $P=0$.

Figure 17:
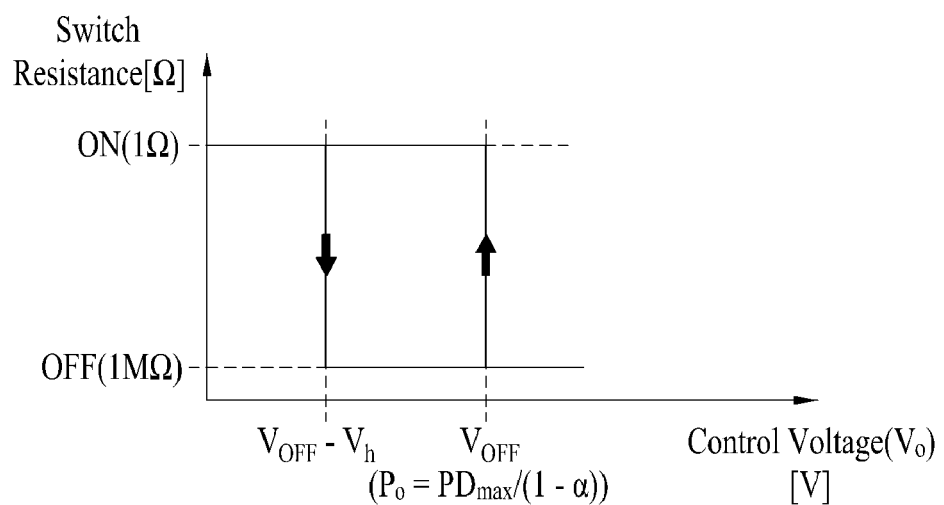
FIG. 17 illustrates a transition function of the switch used in FIG. 16.

FIG. 17 illustrates a transition function of the switch used in FIG. 16.

In some implementations of the present disclosure, the switch is a device that changes conversion of an input optical power into an output optical power by changing switch resistance according to a control voltage. Referring to FIG. 17, the switch controls an ON/OFF operation thereof by controlling switch resistance according to a control voltage $V_o$ [V].

In the example of FIG. 17, $V_{off}$ is a voltage corresponding to a power voltage $V_o$ when an input optical power $P_o$ is $PD_{max}/(1-\alpha)$ in the sensor. $V_h$ is a hysteresis voltage for preventing noise fluctuations. Therefore, when a control voltage equal to or higher than $V_{off}-V_h$ is input to the switch, switch resistance is converted from 1Ω into 1 MΩ, and then the switch is changed from an ON state to an OFF state. Conversely, if a control voltage equal to or less than $V_{off}$ is input while the switch is in an OFF state, the switch resistance is converted from 1 MΩ into 1Ω, and the switch changes from an OFF state to an ON state. Here, $PD_{max}$ is maximum input power constraints corresponding to a saturation point of the PD, which is the detector. That is, if the magnitude of $P_o$ measured by the sensor is larger than $PD_{max}/(1-\alpha)$, the magnitude of $P_i$ is larger than $PD_{max}$, so that a signal larger than $PD_{max}$ is incident and damage to the PD may be prevented.

Structure of Saturation Control-Based Interference Control Receiver

In some implementations of the present disclosure, a transition function of a detector may be controlled by adjusting a saturation point of the detector.

Figure 18:
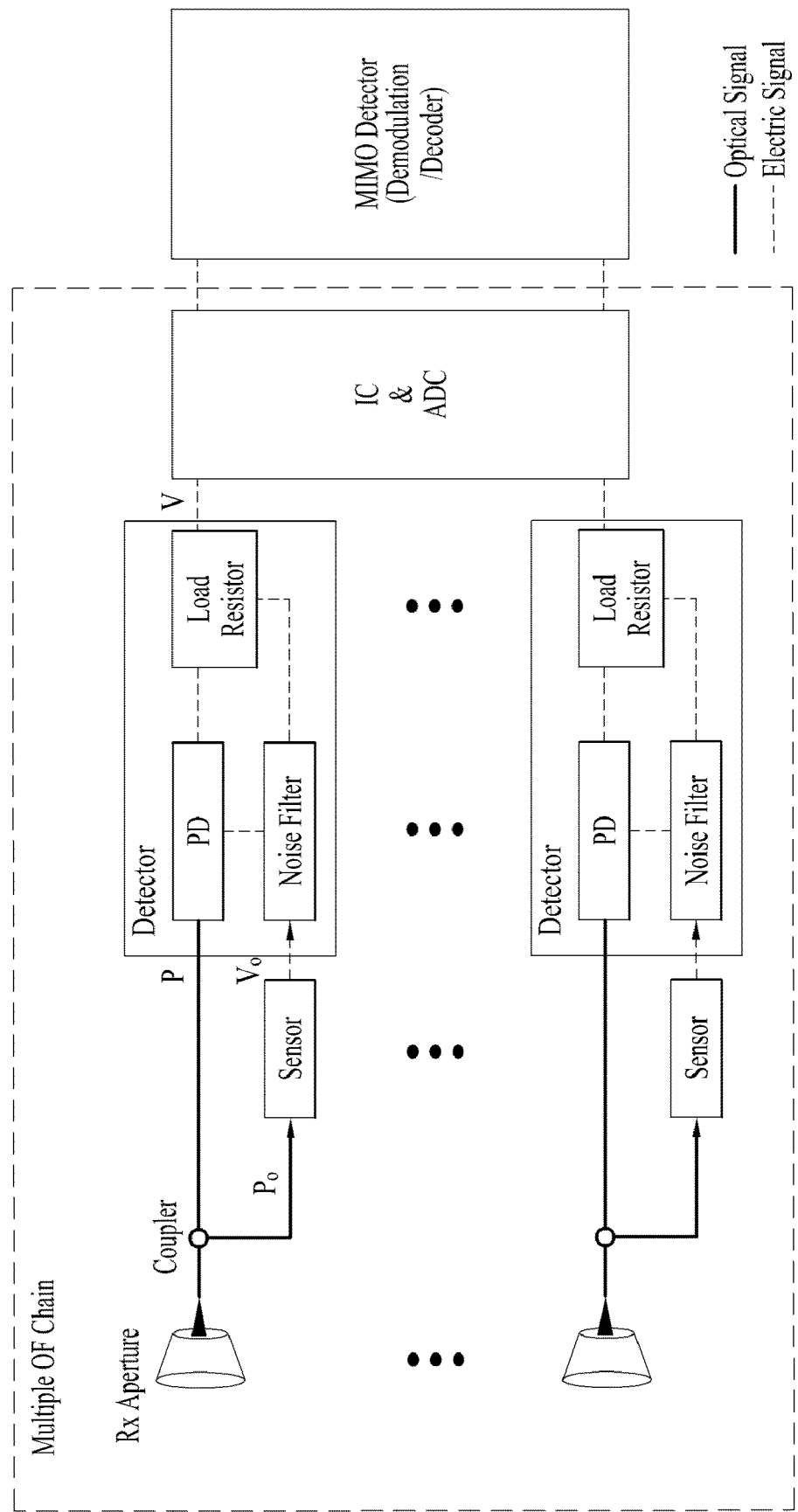
FIG. 18 illustrates an example of the structure of an interference control receiver using an output voltage of a sensor as a power voltage of a detector according to some implementations of the present disclosure.

FIG. 18 illustrates an example of the structure of an interference control receiver using an output voltage of a sensor as a power voltage of a detector according to some implementations of the present disclosure.

Referring to FIG. 18, when a PD is used in a detector for controlling a desired signal based on the magnitude of a sensing signal measured by a sensor, a noise filter and a load resistor may be additionally included in the detector. When the detector is configured based on the noise filter and the load resistor, a saturation point of the detector is controlled using an output voltage of the sensor as a bias voltage of the detector, thereby preventing damage to the PD.

An optical signal received by an Rx aperture is split into a desired signal $P_i$ and a sensing signal $P_o$ in a ratio of $P_i:P_o$ by a coupler, and the split desired signal $P_i$ is input to the detector. In this case, if there is no optical filter, an input optical power $P_i$ is incident upon the PD of the detector in the state of $P=P_i$.

Figure 19:
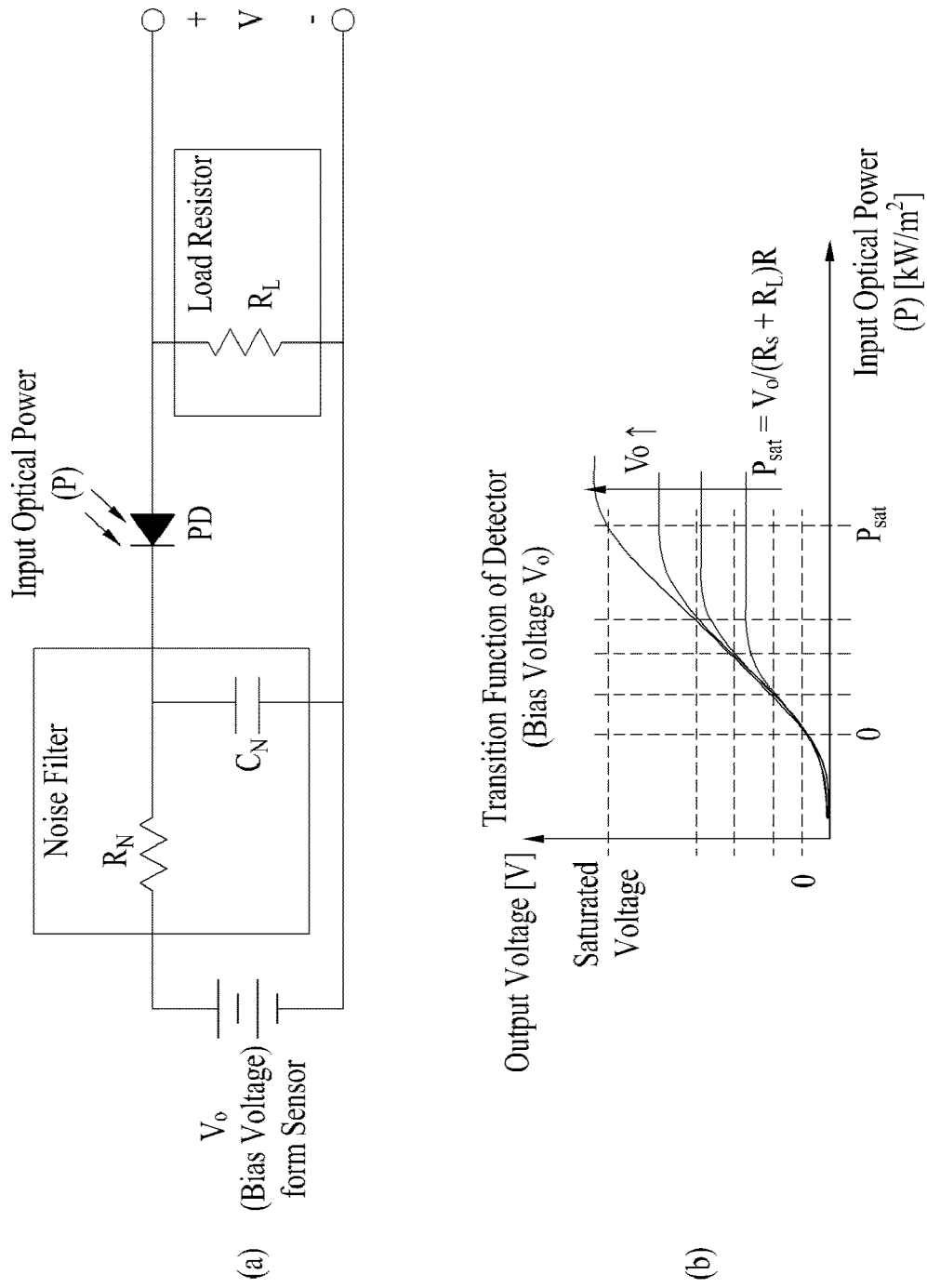
FIG. 19 illustrates the detector used in FIG. 18 and a transition function of the detector.

FIG. 19 illustrates the detector used in FIG. 18 and a transition function of the detector.

A detector composed of a PD, a noise filter, and a load resistor is a device that receives an input optical power P and an output voltage $V_o$ of the sensor and outputs an output voltage V through electrical signal conversion of a desired signal. Referring to FIG. 19, the detector controls a saturation point of the PD using the output voltage of the sensor as a bias voltage $V_o$ [V].

In FIG. 19(a), a noise filter may include a resistor $R_N$ and a capacitor $C_N$.

In the structure of the detector illustrated in FIGS. 18 and 19(a), when the output voltage of the sensor is used as the bias voltage $V_o$ [V], the relationship between the bias voltage $V_o$ and an optical power $P_{sat}$ corresponding to the saturation point of the detector may be represented as follows (if the influence of other elements other than the load resistor and the PD in the detector is very small): $P_{sat}=V_o/((R_s+R_L)R)$. Here, Rs is the resistance of the PD, $R_L$ is load resistance, and R is the responsivity of the PD. The responsivity of the PD or the responsivity of the detector is the ratio of photocurrent to incident (or absorbed) optical power (when the effect of noise is ignored) and is determined within a linear region of a response. That is, in the case of the optical detector, the responsivity represents electrical output per optical input. Therefore, as illustrated in FIG. 19(b), the saturation point of the PD for fixed load resistance changes according to the bias voltage $V_o$.

Since the bias voltage of the detector changes according to $V_o$ measured by the sensor, an increase in $V_o$ increases the saturation point of the PD, thereby guaranteeing the linearity of the PD and preventing damage to the PD.

Structure of Load Resistance Control-Based Interference Control Receiver

In some implementations of the present disclosure, a transition function of a PD may be adjusted by controlling a variable load resistor.

Figure 20:
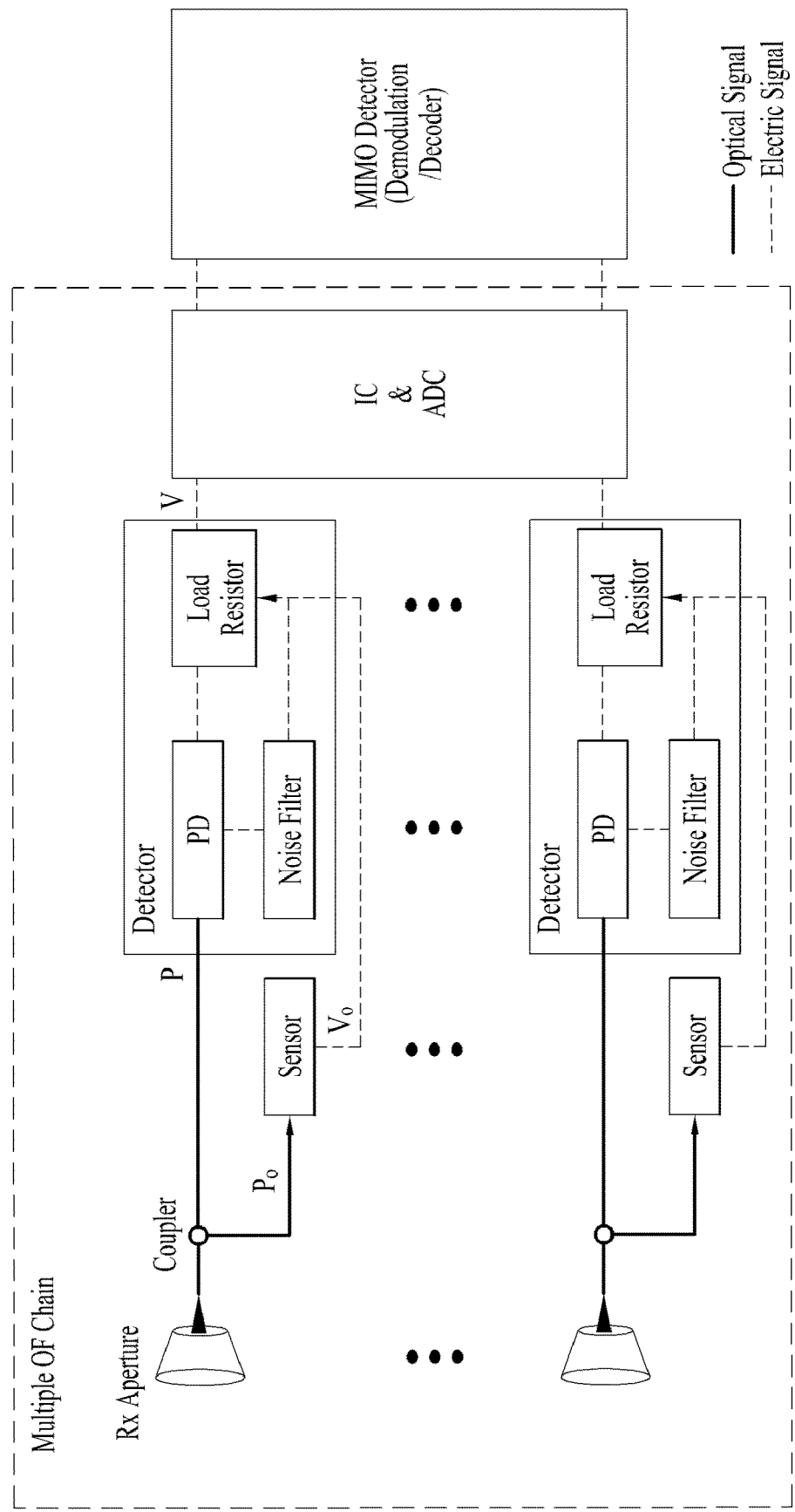
FIG. 20 illustrates an example of the structure of an interference control receiver using an output voltage of a sensor as a power voltage of a detector according to some implementations of the present disclosure.

FIG. 20 illustrates an example of the structure of an interference control receiver using an output voltage of a sensor as a power voltage of a detector according to some implementations of the present disclosure.

Referring to FIG. 20, when a PD is used in a detector for controlling a desired signal based on the magnitude of a sensing signal measured by a sensor, a noise filter and a load resistor may be included in the detector. When the detector is configured based on the noise filter and the load resistor, the load resistor may be configured in the form of a variable resistor, and the load resistor may be controlled according to an output voltage of the sensor, so that damage to the PD may be prevented by controlling a transition function of the detector.

Figure 21:
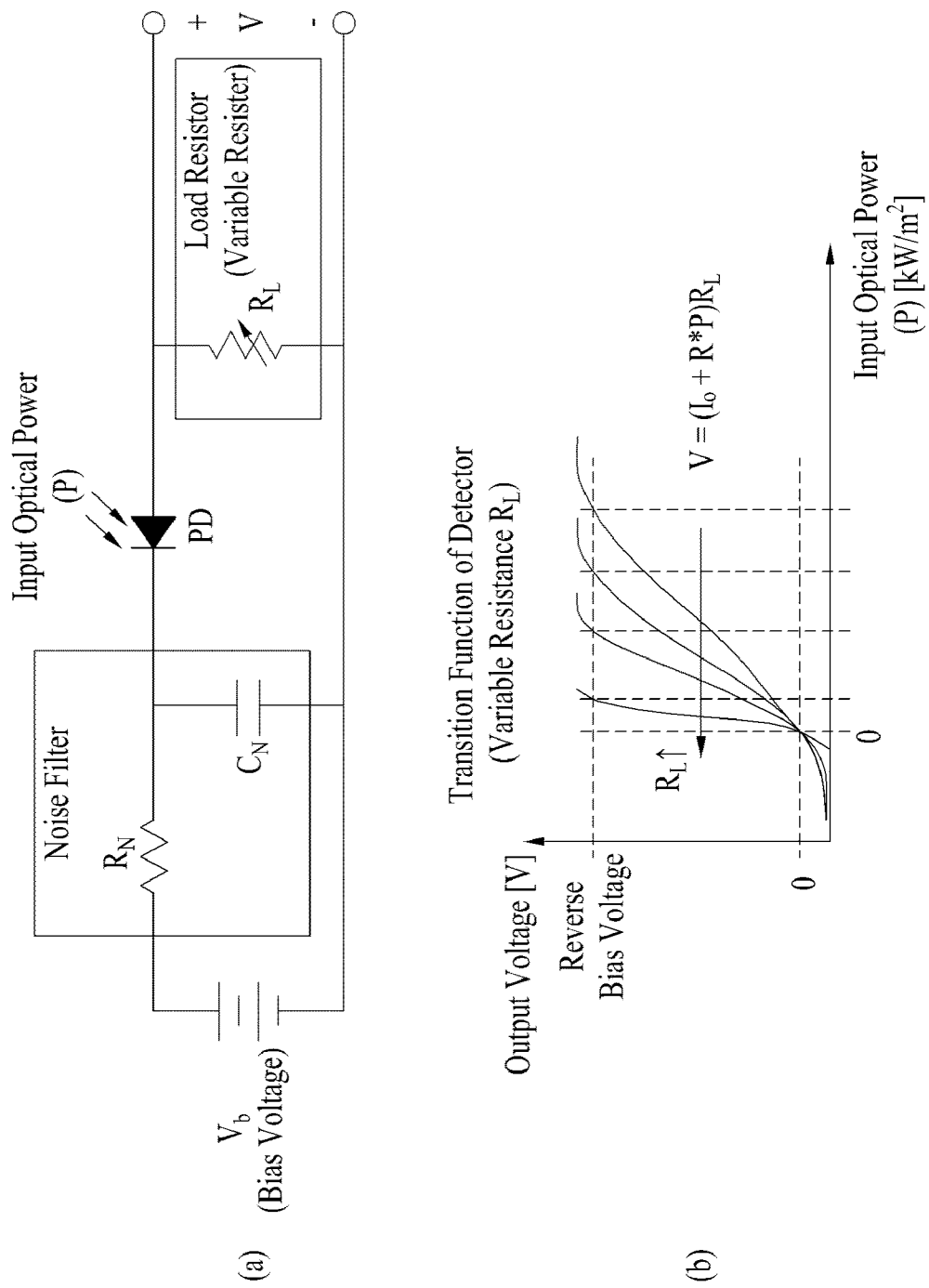
FIG. 21 illustrates the internal structure of a detector that controls a variable load resistor according to an output voltage of a sensor.

FIG. 21 illustrates the internal structure of a detector that controls a variable load resistor according to an output voltage of a sensor.

In the example of FIG. 21(a), a bias voltage $V_b$ determines a predefined saturation limit. Since the bias voltage $V_b$ in FIG. 21(a) has a relationship of $P_{sat}=V_b/((R_s+R_L)R)$ with $P_{sat}$ (if the influence of other elements other than a load resistor and a PD in the detector is very small), the bias value $V_b$ may be a predetermined value based on a predetermined or given $P_{sat}$. In addition, the bias voltage $V_b$ may be a predetermined implementation parameter in terms of circuit design. While, in the example of FIG. 19, the bias voltage $V_b$ is used to variably control $P_{sat}$ using $V_o$, in the example of FIG. 21, a fixed value is used as the bias voltage $V_b$. In the structures of the detectors illustrated in FIGS. 20 and 21(a), an output voltage V of the detector according to the control of a load resistor $R_L$ has the following relationship: $V=(I_o+R*P)*R_L$. Here, $I_o$ is a dark current, R is a responsivity of the PD, and P is an input optical power incident upon the PD. Therefore, as illustrated in FIG. 20(b), the slope of the output voltage V changes according to the value of the load resistor.

Referring to FIG. 21(b), an O/E converting slope with respect to an input optical power P may be controlled by implementing a load resistor in the form of a variable resistor. In this case, an output voltage $V_o$ of a sensor and variable load resistance $R_L$ have an inversely proportional relationship. For example, an increase in $V_o$ reduces $R_L$ to convert the input optical power into an electrical signal in a wider range, and a decrease in $V_o$ increases $R_L$ to convert the input optical power into an electrical signal in a narrower range. Thus, the magnitude of the converted electrical signal in the PD may be maintained, and the relative influence of noise when a signal is decoded at the MIMO detector stage may be reduced, so that the performance of the receiver may be maintained.

Structure of IC and ADC-Based Interference Control Receiver

A device for cancelling an interference element from an electrical signal obtained through O-to-E conversion by a detector in the receiver according to some implementations of the present disclosure and converting the interference-cancelled electric signal into a digital signal through an ADC may be used. In some implementations of the present disclosure, the detector may have any of the structures for preventing damage to a PD.

Figure 22:
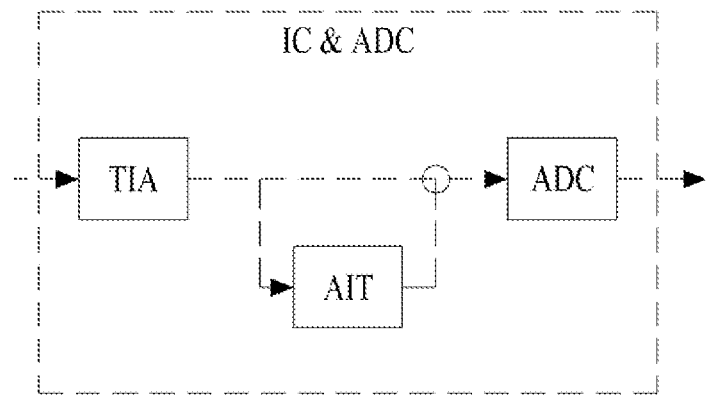
FIG. 22 illustrates an interference cancellation (IC) and analog-to-digital conversion (ADC) unit usable in some implementations of the present disclosure.
Figure 22:
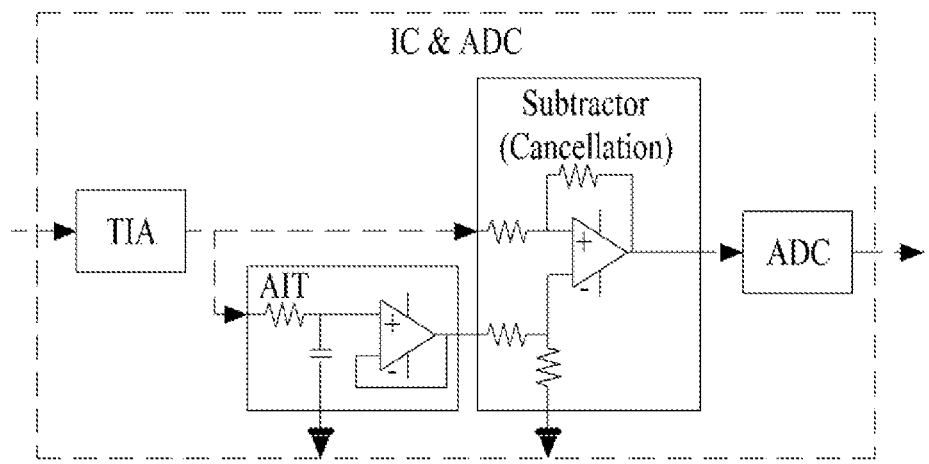

FIG. 22 illustrates an IC and ADC unit usable in some implementations of the present disclosure.

FIG. 22(a) illustrates an IC and ADC unit for a single chain.

The IC and ADC unit illustrated in FIG. 22 may include a transimpedance amplifier (TIA), an average interference tracker (AIT), a subtractor, and an ADC. When the output of the detector is a voltage, the TIA module may be omitted from the IC and ADC unit illustrated in FIG. 21.

In the structure illustrated in FIG. 22, the AIT may be used to measure interference from the output voltage of the TIA and cancel interference before the output voltage is input to the ADC.

Figure 23:
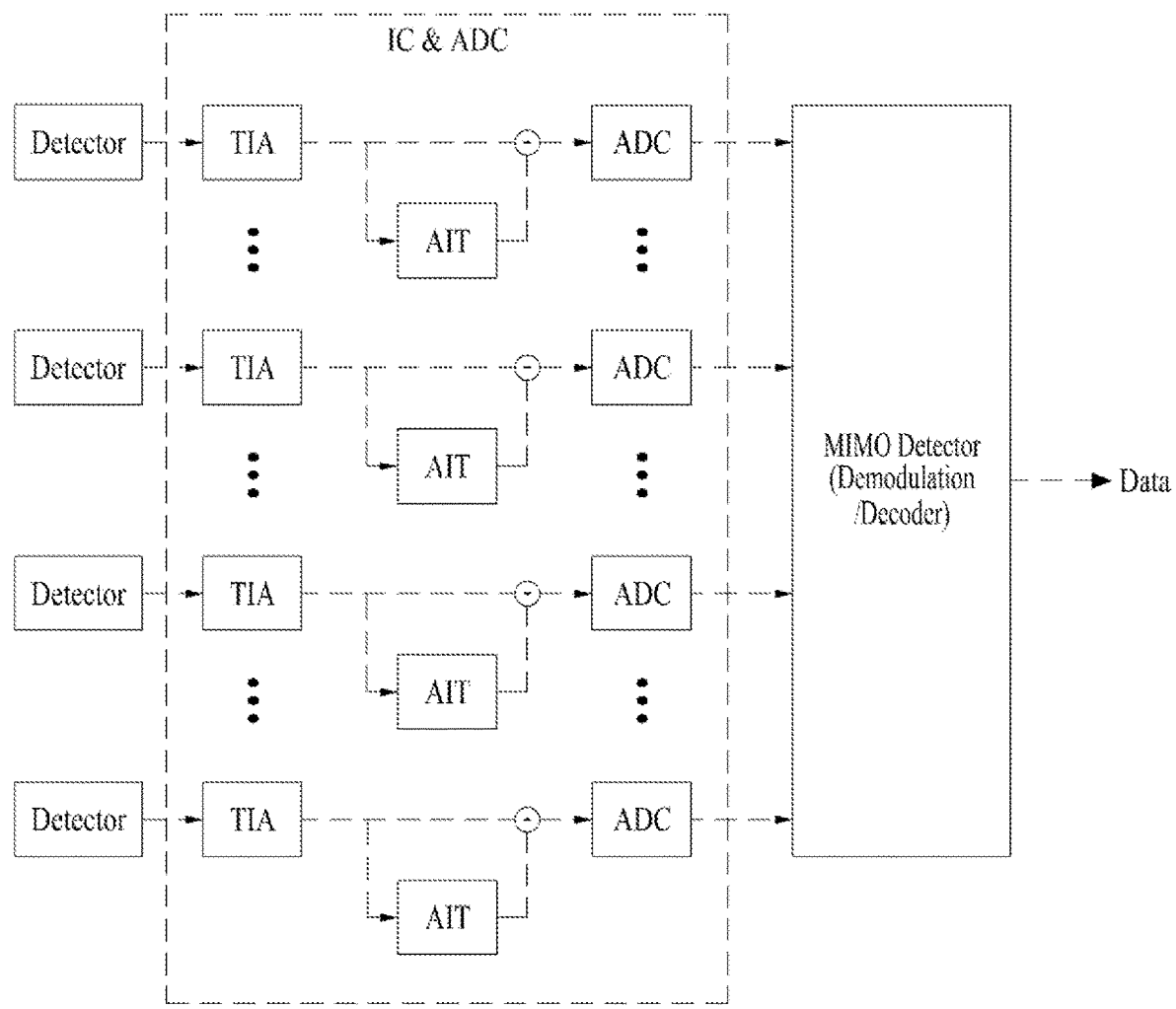
FIGS. 23 and 24 illustrate an IC and ADC unit for multiple chains.
Figure 24:
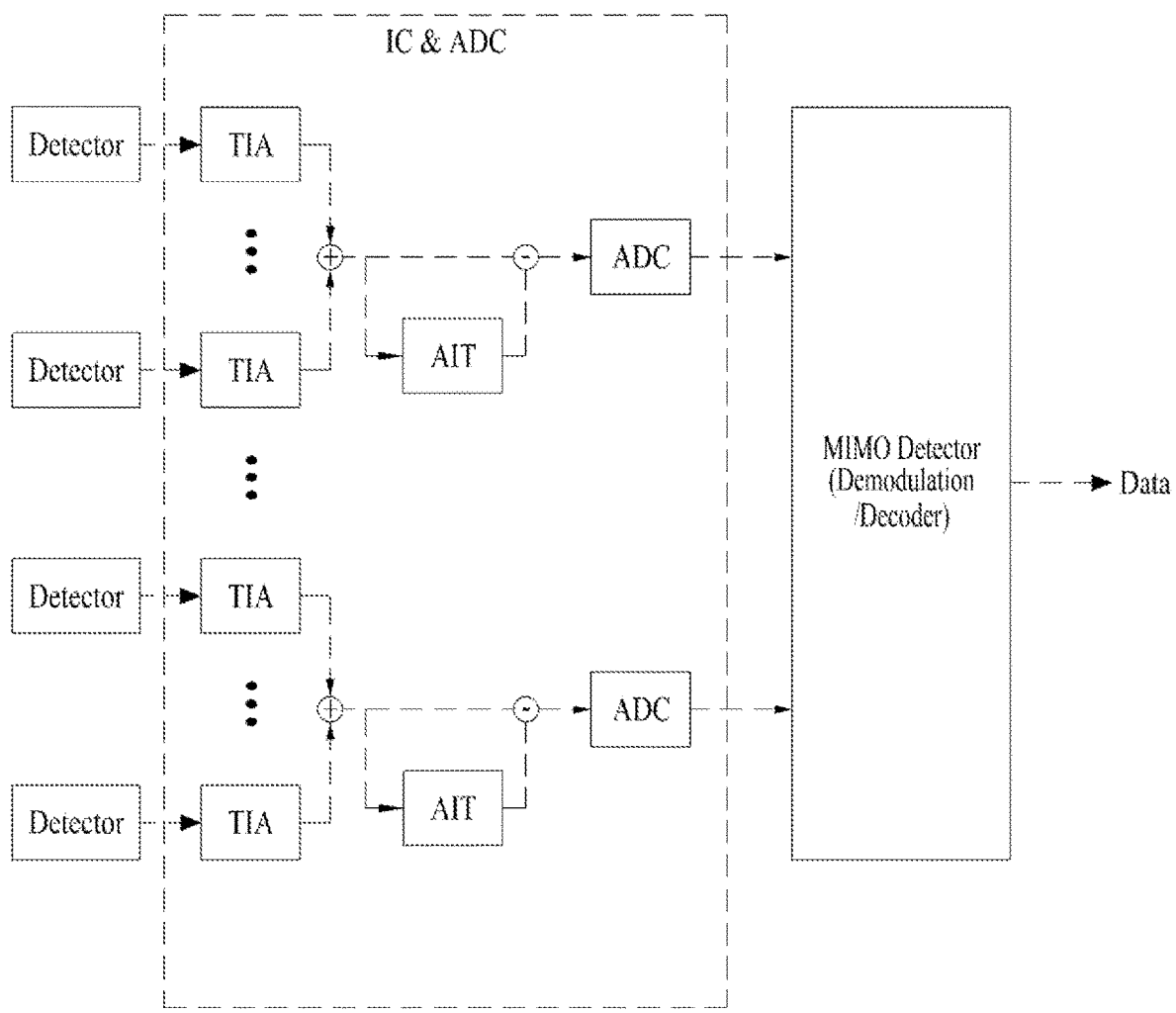

FIGS. 23 and 24 illustrate an IC and ADC unit for multiple chains.

In the IC and ADC unit for multiple chains, a TIA and an AIT may have a 1:1 relationship as illustrated in FIG. 23. For example, referring to FIG. 23, the receiver may measure individual interference for an output voltage of each TIA and cancel the individual interference, so that IC performance may be increased, whereas there may be loss in terms of design cost and energy efficiency.

In the IC and ADC unit for multiple chains, the TIA and AIT may have an N:1 relationship as illustrated in FIG. 23. For example, referring to FIG. 24, the receiver measures total interference by summing all output voltages of the TIAs and removes the total interference, so that design cost and energy efficiency may be increased, whereas IC performance may be reduced.

Even when the receiver is composed of a single chain as well as when the receiver is composed of multiple chains, the receiver may perform interference sensing and cancellation based on the same structure as the IC and ADC unit described with reference to FIG. 23 or FIG. 24.

Figure 25:
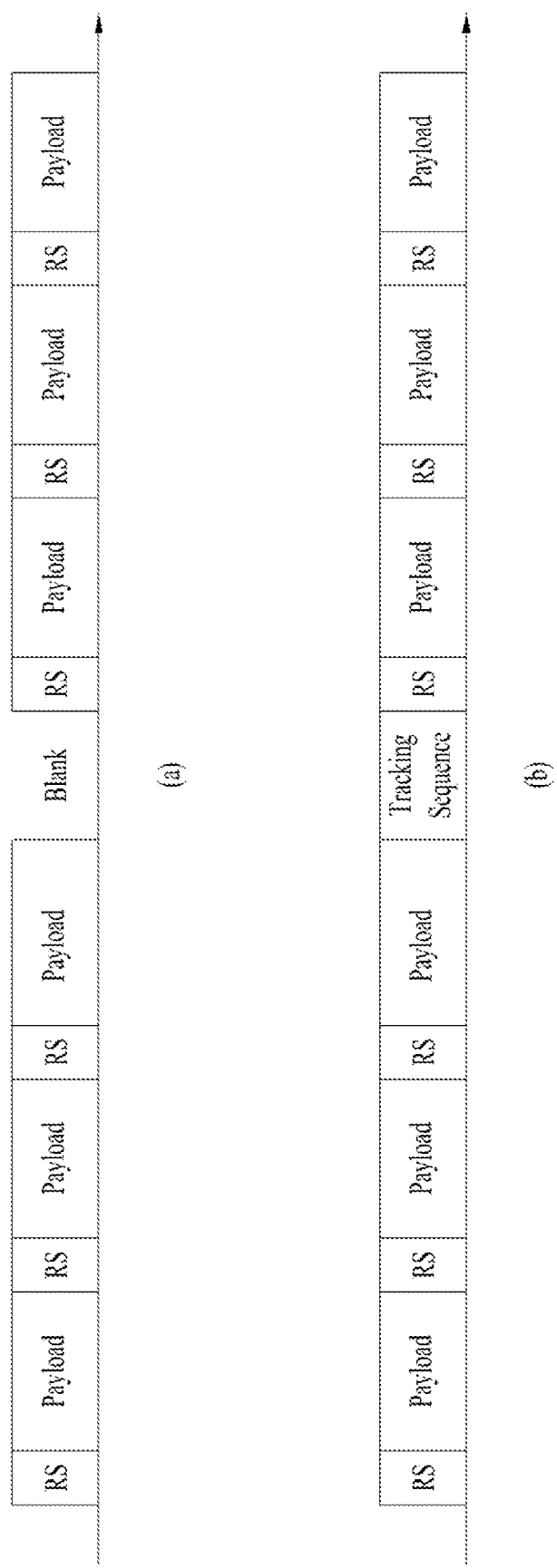
FIG. 25 illustrates a signal for interference measurement according to some implementations of the present disclosure.

FIG. 25 illustrates a signal for interference measurement according to some implementations of the present disclosure.

For the receiver according to some implementations of the present disclosure, a transmitter that transmits a signal based on a signal of an optical band such as infrared light, visible light, or ultraviolet (UV) may be used. According to some implementations of the present disclosure, the transmitter may transmit a prearranged interference measurement reference signal (IMR). The IMR may have the form of a blank signal as illustrated in FIG. 25(a) or the form of a predefined sequence as illustrated in FIG. 25(b). The IMR may be transmitted at a predetermined period or at a predetermined resource location according to an agreement between transmitting and receiving ends.

The period of the IMR may be defined to be shorter than a change period of interference. For example, the receiver may measure sunlight interference using a training sequence or a blank sequence appearing at a shorter period than a change in the amount of light caused by the atmosphere (cloud) or reflection of an object.

In some implementations of the present disclosure, the transmitting end may transmit the IMR between the transmitting end and the receiving end at a predetermined period or a predetermined resource location, for accurate measurement by the AIT at the receiving end.

According to some implementations of the present disclosure, Rx diversity for an LOS path and/or an NLOS path may be obtained based on the receiver forming multiple chains.

According to some implementations of the present disclosure, even if the probability of ambient light interference increases as Rx diversity increases, damage to the detector due to ambient light may be controlled by sensing an optical signal and/or controlling the magnitude of optical power at the front end of the detector.

According to some implementations of the present disclosure, interference may be canceled in terms of an electrical signal by tracking an interference element that has passed through the detector.

An optical communication device may include a receiver that performs operations according to some implementations of the present disclosure.

In some implementations of the present disclosure, the receiver may include at least one Rx aperture configured to receive an optical signal; at least one coupler configured to split the optical signal received through the Rx aperture into a desired signal and a sensing signal; at least one sensor configured to determine a control voltage $V_o$ based on the sensing signal; and at least one detector configured to output an electrical signal having an output voltage V based on the desired signal and the control voltage $V_o$. The detector may be configured to change a transition function of the detector based on the control voltage $V_o$.

In some implementations of the present disclosure, the detector may include a photodiode to which the desired signal is input, a noise filter connected to the photodiode, and a load resistor connected to the noise filter and the photodiode and configured to output the electrical signal having the output voltage V.

In some implementations of the present disclosure, the control voltage $V_o$ may be input to the noise filter. The transition function of the detector may have a saturation point $P_{sat}=V_o/\{(R_s+R_L)*R\}$, where $R_s$ denotes a resistance of the photodiode, $R_L$ denotes a resistance of the load resistor, and R denotes a responsivity of the photodiode.

In some implementations of the present disclosure, the control voltage $V_o$ may be input to the load resistor. The output voltage, related to output of the transition function, is $V=(I_o+R*P)*R_L$, where $I_o$ denotes a dark current, R denotes a responsivity of the photodiode, P denotes a power of the desired signal input to the photodiode, and $R_L$ denotes a resistance of the load resistor.

In some implementations of the present disclosure, the receiver may include a plurality of couplers, a plurality of sensors connected respectively to the plurality of couplers, and a plurality of detectors connected respectively to the plurality of couplers and connected respectively to the plurality of sensors. Each of the plurality of detectors may be configured to change a related transition function based on a control voltage input to a related detector.

In some implementations of the present disclosure, the receiver may further include an IC and ADC unit configured to cancel interference from the electrical signal and convert the electrical signal into a digital signal.

In some implementations of the present disclosure, the receiver may include an Rx aperture configured to receive an optical signal; a coupler configured to split the optical signal received through the Rx aperture into a desired signal and a sensing signal; a sensor configured to determine a control voltage $V_o$ based on the sensing signal; an optical filter configured to attenuate an optical power of the desired signal based on the control voltage $V_o$ and output the desired signal having the attenuated optical power; and a detector configured to output an electrical signal based on the desired signal having the attenuated optical power. In some implementations, the optical filter may be an attenuator. In some implementations, the optical filter may be a switch.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:

1. A receiver comprising:
a reception aperture configured to receive an optical signal;
a coupler configured to split the optical signal received through the reception aperture into a desired signal and a sensing signal;
a sensor configured to determine a control voltage $V_o$ based on the sensing signal; and
a detector configured to output an electrical signal having an output voltage V based on the desired signal and the control voltage $V_o$,
wherein the detector includes i) a photodiode to which the desired signal is input, ii) a noise filter to which the control voltage $V_o$ is input and which is connected to the photodiode, and iii) a load resister which is connected to the noise filter and the photodiode and outputs the electrical signal having the output voltage V, such that a transition function of the detector has a saturation point $P_{sat}=V_o/\{(R_s+R_L)*R\}$, where $R_s$ denotes a resistance of the photodiode, $R_L$ denotes a resistance of the load resistor, and R denotes a responsivity of the photodiode.

2. The receiver of claim 1, comprising:
a plurality of couplers, a plurality of sensors connected respectively to the plurality of couplers, and a plurality of detectors connected respectively to the plurality of couplers and connected respectively to the plurality of sensors, and
wherein each of the plurality of detectors is configured to change a related transition function based on a control voltage input to a related detector.

3. The receiver of claim 1, further comprising:
an interference cancellation and analog-to-digital conversion unit that includes
an average interference tracker configured to measure interference from the electrical signal;
a subtractor configured to subtract the interference from the electric signal to output an interference canceled electrical signal; and
an analog-to-digital converter configured to convert the interference canceled electrical signal into a digital signal.

4. A receiver comprising:
a reception aperture configured to receive an optical signal;
a coupler configured to split the optical signal received through the reception aperture into a desired signal and a sensing signal;
a sensor configured to determine a control voltage Vo based on the sensing signal; and
a detector configured to output an electrical signal having an output voltage V based on the desired signal and the control voltage $V_o$,
wherein the detector includes i) a photodiode to which the desired signal is input, ii) a noise filter connected to the photodiode, and iii) a variable load resister to which the control voltage $V_o$ is input and which is connected to the noise filter and the photodiode, and outputs the electrical signal having the output voltage V, such that the output voltage V, which is output of a transition function of the detector, is $V=(I_o+R*P)*R_L$, where $I_o$ denotes a dark current, R denotes a responsivity of the photodiode, P denotes a power of the desired signal input to the photodiode, and $R_L$ denotes a resistance of the variable load resistor.

5. The receiver of claim 4, comprising:
a plurality of couplers, a plurality of sensors connected respectively to the plurality of couplers, and a plurality of detectors connected respectively to the plurality of couplers and connected respectively to the plurality of sensors, and
wherein each of the plurality of detectors is configured to change a related transition function based on a control voltage input to a related detector.

6. The receiver of claim 4, further comprising:
an interference cancellation and analog-to-digital conversion unit that includes
an average interference tracker configured to measure interference from the electrical signal;
a subtractor configured to subtract the interference from the electric signal to output an interference canceled electrical signal; and
an analog-to-digital converter configured to convert the interference canceled electrical signal into a digital signal.

* * * * *